US012429821B2

(12) United States Patent
Membrez

(10) Patent No.: US 12,429,821 B2
(45) Date of Patent: Sep. 30, 2025

(54) HOROLOGICAL MOVEMENT COMPRISING A MEMBER PROVIDED WITH MEANS FOR VARIABLY ADJUSTING THE INCLINATION

(71) Applicant: BLANCPAIN SA, Le Brassus (CH)

(72) Inventor: Anthony Membrez, Courtételle (CH)

(73) Assignee: BLANCPAIN SA, Le Brassus (CH)

( * ) Notice: Subject to any disclaimer, the term of this patent is extended or adjusted under 35 U.S.C. 154(b) by 394 days.

(21) Appl. No.: 18/061,597

(22) Filed: Dec. 5, 2022

(65) Prior Publication Data

US 2023/0185243 A1 Jun. 15, 2023

(30) Foreign Application Priority Data

Dec. 10, 2021 (EP) .................................... 21213631

(51) Int. Cl.

| | |
|---|---|
| ***G04B 17/28*** | (2006.01) |
| ***G04B 15/14*** | (2006.01) |
| ***G04B 17/06*** | (2006.01) |

(52) U.S. Cl.

CPC ........... *G04B 17/285* (2013.01); *G04B 15/14* (2013.01); *G04B 17/063* (2013.01)

(58) Field of Classification Search

CPC .... G04B 17/285; G04B 15/14; G04B 17/063; G04B 33/08; G04B 29/025; G04B 19/283

See application file for complete search history.

(56) References Cited

U.S. PATENT DOCUMENTS

| | | | | |
|---|---|---|---|---|
| 7,677,793 | B2 * | 3/2010 | Lete | G04B 19/283 368/142 |
| 7,946,755 | B2 * | 5/2011 | Greubel | G04B 33/08 368/142 |
| 11,360,432 | B2 * | 6/2022 | Buehler | G04B 19/082 |
| 2008/0198701 | A1 | 8/2008 | Lete et al. | |

FOREIGN PATENT DOCUMENTS

| | | | |
|---|---|---|---|
| CN | 693832 | A5 | 2/2004 |
| JP | 2009-501325 | A | 1/2009 |

OTHER PUBLICATIONS

European Search Report for EP 21213631 dated May 18, 2022.

* cited by examiner

*Primary Examiner* — Edwin A. Leon
(74) *Attorney, Agent, or Firm* — Sughrue Mion, PLLC

(57) ABSTRACT

A horological movement including a plate (33) extending substantially in a first plane and being configured to support the other parts of the movement, such as a member extending at least in part along a second plane. The horological movement includes variable adjustment means (30, 40, 130) for variably adjusting the inclination of the member (1, 10, 100) relative to the plate (33). The variable adjustment means includes an inclining bridge (7, 57, 107) on which the member (1, 10, 100) is mounted, the inclining bridge (7, 57, 107) being inclining relative to the plate (33), such that the second plane forms an angle of variable value with the first plane of the plate (33).

20 Claims, 12 Drawing Sheets

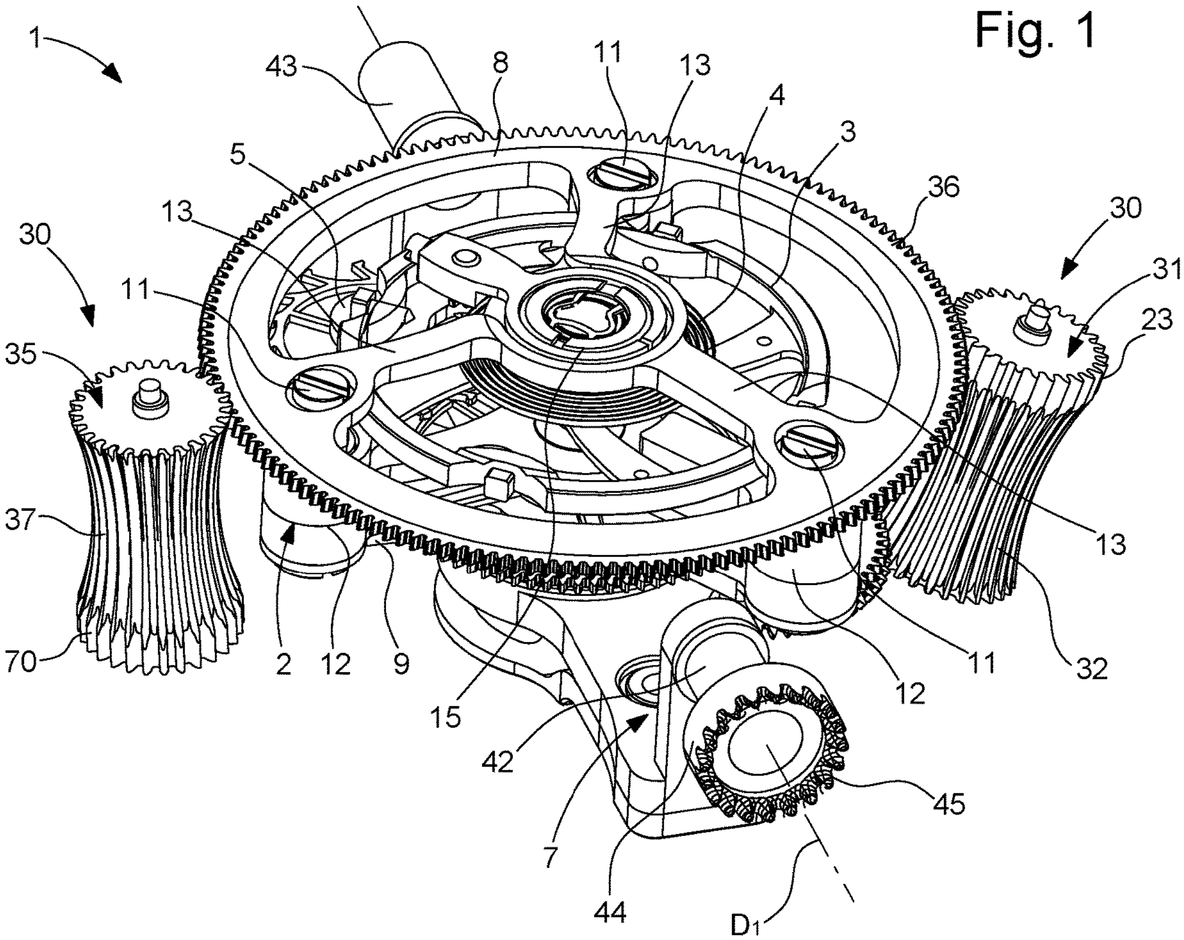
Fig. 1
Fig. 2
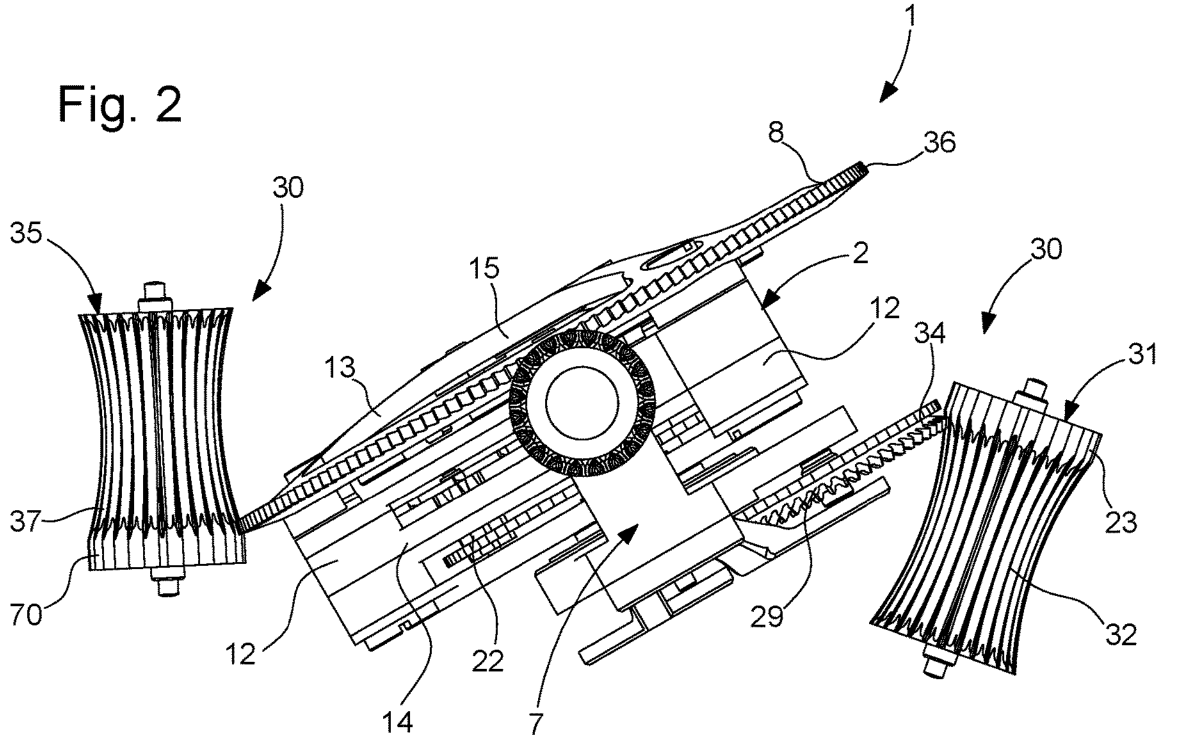

HOROLOGICAL MOVEMENT COMPRISING A MEMBER PROVIDED WITH MEANS FOR VARIABLY ADJUSTING THE INCLINATION

CROSS-REFERENCE TO RELATED APPLICATIONS

This application claims priority to European Patent Application No. 21213631.1 filed Dec. 10, 2021, the entire contents of which are incorporated herein by reference.

TECHNICAL FIELD OF THE INVENTION

The invention relates to the field of horological movements comprising a member provided with means for variably adjusting the inclination.

TECHNOLOGICAL BACKGROUND

Most mechanical watches today are equipped with members, which are either purely decorative, or at least partly movable so as to fulfil a particular display function, or which have both of these features.

The at least partly movable members are, for example, display devices provided with hands, a movable automaton, a lunar phase, or a movable decorative element, which can be actuated by drive means of the movement.

More particularly, in the at least partly movable members, regulating members exist and comprise a sprung balance and a Swiss lever escapement mechanism. The sprung balance constitutes the time base of the watch. It is also referred to as a resonator.

The escapement has two main functions:

to maintain the two- and -fro motions of the resonator;

to count these to- and -fro motions.

An inertial mass, a guide and an elastic return element are required in order to constitute a mechanical resonator. Conventionally, a balance spring acts as an elastic return element for the inertial mass constituted, for example, by a balance. This balance is guided in rotation by pivots which rotate inside plain ruby bearings.

In order to reduce the undesirable effects of gravity on the motion of the regulating member, complications of the tourbillon or karussel type exist, which cause the regulating member to rotate about an axis. These complications also have a particular aesthetic appeal, which makes the timepiece singularly attractive.

For aesthetic reasons, and in particular to facilitate the observation thereof by a user, certain regulating members are inclined on the plate. In some models, the regulating member is even inclined along a plurality of axes.

However, in general, the inclination is defined during the construction and assembly of the regulating member on the movement, but cannot be modified during use.

SUMMARY OF THE INVENTION

The purpose of the invention is to overcome the aforementioned drawbacks, and aims to provide a horological movement comprising a member that is capable of being inclined at an adjustable angle of inclination.

To this end, the invention relates to a horological movement comprising a plate extending substantially in a first plane, the plate being configured to support the other parts of the movement, in particular a member extending at least in part along a second plane.

The movement is noteworthy in that it comprises means for variably adjusting the inclination of the member relative to the plate, the means for variably adjusting the inclination of the member comprising an inclining bridge on which the member is mounted, the inclining bridge being inclining relative to the plate, such that the second plane forms an angle of variable value with the first plane of the plate.

In this way, the member can be inclined relative to the plate in a preferred position thanks to the inclining bridge. Moreover, the inclination can be modified as desired, according to the wishes of the wearer.

Thanks to the invention, the member is no longer fixed in a predefined position or movement. Depending on the orientation of the timepiece, the member can be inclined in a preferred position, in particular for better viewing.

According to a specific embodiment of the invention, the bridge comprises a longitudinal main platform on which the member is mounted.

According to a specific embodiment of the invention, the inclining bridge comprises a secondary platform arranged beneath the main platform, so as to arrange at least one staff between the two platforms.

According to a specific embodiment of the invention, the inclining bridge is mounted such that it rotates about an axis of rotation passing through the member.

According to a specific embodiment of the invention, the bridge includes two external pivots arranged symmetrically on either side of the member, the pivots being arranged along the axis of rotation of the inclining bridge.

According to a specific embodiment of the invention, each of the pivots cooperate with a bearing of the plate, the two pivots being capable of rotating inside each bearing.

According to a specific embodiment of the invention, the adjustment means include a wheel mounted such that it is integral with the inclining bridge, the actuation of the wheel generating the inclination of the inclining bridge.

According to a specific embodiment of the invention, the wheel comprises an inclining toothing disposed around one of the pivots, the inclining toothing extending parallel to the axis of rotation of the inclining bridge.

According to a specific embodiment of the invention, the movement comprises means for actuating the inclination of the inclining bridge.

According to a specific embodiment of the invention, the inclining toothing cooperates with the actuating means, the actuating means meshing with the wheel, such that the inclining bridge rotates about the axis of rotation of the inclining bridge.

According to a specific embodiment of the invention, the actuating means include a gear train provided with a last wheel meshing with the inclining toothing of the wheel.

According to a specific embodiment of the invention, the actuating means include a rod actuating the gear train by rotation of the rod, the rod being capable of being actuated from outside the plate.

According to a specific embodiment of the invention, the angle of inclination of the member relative to the plate is in the range of 0° to 45°.

According to a specific embodiment of the invention, the member is a regulating member provided with an inertial mass, a guide and an elastic return element for the inertial mass which are configured to cause it to oscillate, as well as an escapement mechanism cooperating with the inertial mass.

According to a specific embodiment of the invention, the means for variably adjusting the inclination of the regulating member comprise a carriage inside which the inertial mass, the guide, the elastic return element and the escapement mechanism are arranged, the carriage being mounted on the inclining bridge.

According to a specific embodiment of the invention, the carriage is capable of rotating relative to the inclining bridge, with the regulating member being of the tourbillon or karussel type.

According to a specific embodiment of the invention, the carriage is unmoving relative to the inclining bridge.

According to a specific embodiment of the invention, the member is an automaton or a decorative part of the movement.

The invention further relates to a timepiece including such a movement.

BRIEF DESCRIPTION OF THE FIGURES

The purposes, advantages and features of the present invention will appear after reading several embodiments, which are provided for purposes of illustration only and not intended to limit the scope of the invention, given with reference to the accompanying drawings, wherein:

FIG. 1 diagrammatically shows a perspective view of a karussel according to the invention in a position parallel to the first plane of the plate, FIG. 2 diagrammatically shows a side view of the karussel according to the invention in an inclined position relative to the first plane of the plate, FIG. 3 diagrammatically shows a sectional view of the karussel taken along a plane passing through the first and second transmission gears, with the karussel in a position parallel to the first plane of the plate, FIG. 4 diagrammatically shows a cross-sectional view of the karussel taken along a plane passing through the escapement mechanism and the first transmission gear, with the karussel in a position parallel to the first plane of the plate, FIG. 5 diagrammatically shows a sectional side view of the cut of a transmission gear of the karussel according to the invention, FIG. 6 diagrammatically shows a perspective view of the karussel according to the invention in a position parallel to the first plane of the plate, FIG. 7 diagrammatically shows a bottom view of the karussel according to the invention in a position parallel to the first plane of the plate, FIG. 8 diagrammatically shows a top view of the karussel according to the invention in a position parallel to the first plane of the plate, FIG. 9 diagrammatically shows a perspective view of the meshing of a transmission gear of the karussel with a crown according to the invention in a position parallel to the first plane of the plate, FIG. 10 diagrammatically shows a perspective view of a timepiece plate provided with the karussel according to the invention in an inclined position relative to the first plane of the plate, FIG. 11 diagrammatically shows a side view of the meshing of the first transmission gear of the karussel with the gear trains according to the invention in a position parallel to the first plane of the plate, FIG. 12 diagrammatically shows a perspective view of an inclining bridge of the karussel according to the invention, FIG. 13 diagrammatically shows a sectional side view of the karussel along an axis passing through the bridge, FIG. 14 diagrammatically shows a perspective view of a tourbillon according to the invention in a position parallel to the first plane of the plate, FIG. 15 diagrammatically shows a side view of the tourbillon according to the invention in an inclined position relative to the first plane of the plate, FIG. 16 diagrammatically shows a sectional view of the tourbillon according to the invention in a position parallel to the first plane of the plate, FIG. 17 diagrammatically shows a side view of the meshing of a ring of the tourbillon by a transmission gear according to the invention, with the tourbillon in a position parallel to the first plane of the plate, FIG. 18 diagrammatically shows a top view of the tourbillon according to the invention in a position parallel to the first plane of the plate, FIG. 19 diagrammatically shows a perspective view of the tourbillon according to the invention in an inclined position relative to the first plane of the plate, FIG. 20 diagrammatically shows a bottom view of the tourbillon according to the invention in a position parallel to the first plane of the plate, FIG. 21 diagrammatically shows a perspective view of a timepiece provided with the tourbillon according to the invention in an inclined position relative to the first plane of the plate, FIG. 22 diagrammatically shows a perspective view of an inclining bridge of the tourbillon according to the invention, FIG. 23 diagrammatically shows a sectional view of a regulating member according to the invention in a position parallel to the first plane of the plate, FIG. 24 diagrammatically shows a perspective view of the regulating member according to the invention in a position parallel to the first plane of the plate, FIG. 25 diagrammatically shows a perspective view of the regulating member according to the invention in an inclined position relative to the first plane of the plate, FIG. 26 diagrammatically shows a side view of the regulating member according to the invention in an inclined position relative to the first plane of the plate, FIG. 27 diagrammatically shows a bottom view of the regulating member according to the invention in a position parallel to the first plane of the plate, and FIG. 28 diagrammatically shows a top view of the regulating member according to the invention in a position parallel to the first plane of the plate.

DETAILED DESCRIPTION OF THE INVENTION

Figure 3:
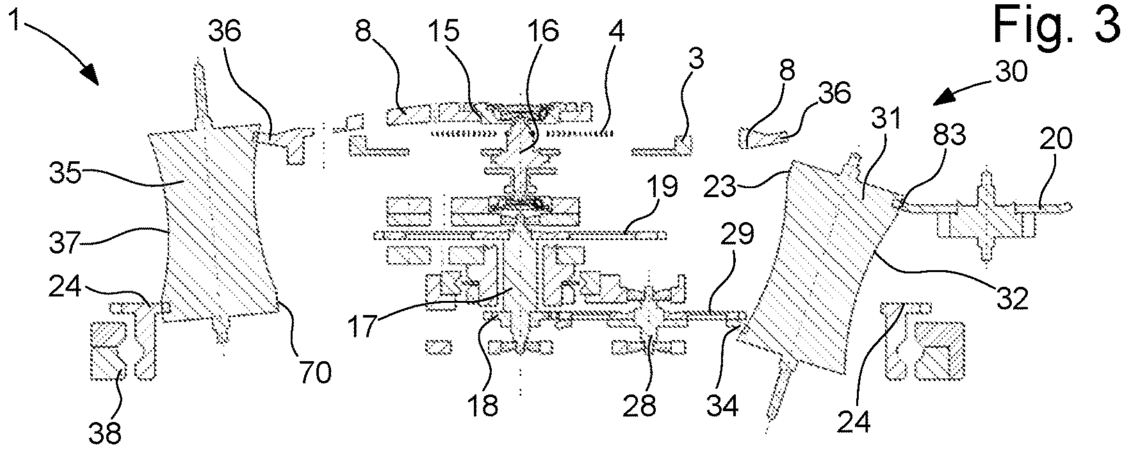

The invention relates to a horological movement comprising a plate extending substantially in a first plane, the plate being configured to support parts of the movement. The movement includes drive means comprising a barrel, a gear system and a member.

In the embodiments shown in the figures, the member is a regulating member provided with an inertial mass, a guide and an elastic return element for the inertial mass configured to cause it to oscillate substantially in a second plane, as well as an escapement mechanism cooperating with the inertial mass.

In the following description, the driving means refer to the parts for supplying and transmitting the energy necessary for the operation of the regulating member, the adjustment means refer to the elements for inclining and driving the regulating member while allowing for the transmission of energy, and the actuating means refer to the parts arranged to modify the inclination of the regulating member, for example by a user.

FIGS. 1 to 13 show in particular a regulating member of the karussel type 1. The invention does not specifically relate to the intrinsic features and operation of a karussel, which are known to a person skilled in the art.

The karussel 1 includes a karussel carriage 2, inside which a mechanical resonator with an inertial mass 3, a guide and an elastic return element 4, as well as a Swiss lever escapement mechanism 5 are arranged. The karussel carriage 2 is mounted such that it rotates about an axis of rotation by means of a ball bearing 6 arranged between the karussel carriage 2 and an inclining bridge 7 on which the karussel carriage 2 is mounted.

The karussel carriage 2 comprises an upper support 8 and a lower support 9, which are assembled by screws 11 inserted into posts 12, of which there are three. The mechanical resonator with the inertial mass, the guide and the elastic return element, as well as the escapement mechanism are suspended between the upper support 8 and the lower support 9. According to a non-limiting alternative embodiment, the upper support 8 is a circular wheel, provided in this case with three branches 13, connected to a central hub 15. The lower support 9 in this case comprises three arms 14 extending from a central junction, the arms 14 connecting the three eccentric posts 12 to the central junction. The three posts 12 are angularly distributed around the periphery of the karussel carriage 2, so as to connect the circular wheel to each arm 14.

The inertial mass 3 is an annular balance arranged on a first axial staff 16 disposed in the middle of the karussel carriage 2. The first axial staff 16 is substantially perpendicular to the second plane of the inertial mass.

Figure 4:
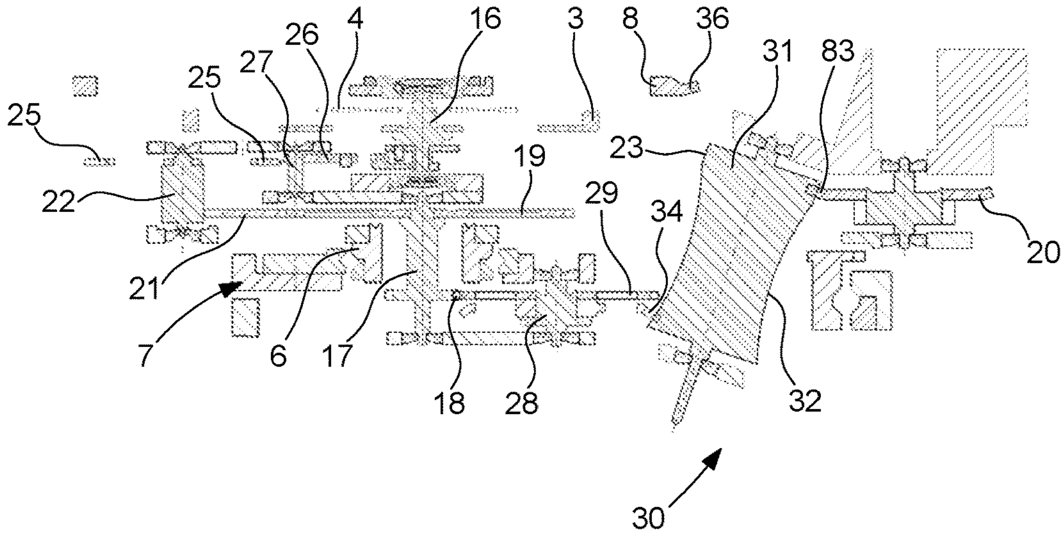

The balance is disposed in the upper part of the karussel carriage 2 so that it is visible from the outside. The balance is configured to perform a rotary oscillatory motion about the first axial staff 16, within the karussel carriage 2 at a predetermined frequency, as shown in FIGS. 3 and 4.

To actuate the mechanical resonator, a second axial staff 17, substantially collinear with the first axial staff 16, is disposed beneath the first axial staff 16. The second axial staff 17 partially extends beneath the karussel carriage 2 and the inclining bridge 7. A first axial pinion 18 integral with the second axial staff 17 at the centre thereof, is coaxial with the balance and is arranged beneath the karussel carriage 2.

An intermediate wheel 19 is integral with the second axial staff 17 beneath the balance in the karussel carriage 2. The intermediate wheel 19 meshes with an escape pinion 21 arranged on a third radial staff 22, which is substantially parallel to the axial staffs 16, 17. The third radial staff 22 is arranged in the karussel carriage 2. The third radial staff 22 also holds an escape wheel 25, which is disposed above the escape pinion 21. The escape wheel 25 cooperates with a Swiss lever 26 disposed perpendicularly between the first axial staff 16 and the periphery of the escape wheel 25. The lever 26 comprises an elongate body with a fork at a first end, the fork being configured to cooperate with a pin of the first axial staff 16, which is linked to the movement of the balance. The second end of the lever 26 includes two pallets arranged to cooperate with the escape wheel 25, alternately blocking the rotation thereof, so as to cause it to rotate in steps. The lever 26 is carried by a fourth radial staff 27 arranged in the karussel carriage 2 between the first axial staff 16 and the third radial staff 22.

The inclining bridge 7 carries the regulating member, the second axial staff 17 passing through the inclining bridge 7. The first axial pinion 18 is arranged beneath the inclining bridge 7.

Turning the first axial pinion 18 actuates the escape wheel 25, the lever 26 and the movement of the balance, via the intermediate wheel 19 and the escape pinion 21, which rotate the third radial staff 22.

The karussel 1 further comprises a radial gear-wheel 29 disposed beneath the karussel carriage 2, which meshes with the first axial pinion 18. The radial gear-wheel 29 is carried by a fifth radial staff 28 arranged beneath the karussel carriage 2. Actuation of the radial gear-wheel 29 causes the first axial pinion 18 to rotate.

The horological movement comprises variable adjustment means 30 for variably adjusting the inclination of the regulating member relative to the plate, such that the second plane of the inertial mass forms an angle of variable value with the first plane of the plate, as shown in FIGS. 1 and 2.

Thus, the karussel 1 can be displaced between a position in which the second plane of the inertial mass is substantially parallel to the first plane of the plate, and an oblique position in which the second plane of the inertial mass forms an angle with the first plane of the plate.

The angle of inclination can be selected using the variable inclination adjustment means 30. Preferably, the variable adjustment means 30 modify the angle of inclination of the regulating member relative to the plate in a range of 0° to 45°. Thus, for 0°, the balance of the regulating member is preferably parallel to the first plane of the plate, whereas at 45°, the regulating member is oblique to the first plane of the plate. By means of the variable adjustment means 30, the angle can take any value between the two extreme values. In FIG. 1, the minimum angle is substantially 0°, whereas in FIG. 2, the maximum angle is 30°. In this embodiment, the maximum angle is 30°.

According to the invention, in order to obtain such an adjustable inclination, the variable adjustment means 30 include a first transmission gear 31 arranged on the plate. The first transmission gear 31 is capable of moving in rotation relative to the plate thanks to the drive means. The first transmission gear 31 is inclined relative to the plate. The first transmission gear 31 comprises a substantially spherical toothing 32 configured to mesh with a radial gear-wheel 29 of the regulating member to actuate the escapement mechanism and the balance.

The first transmission gear 31 has an hourglass shape with concave cylindrical symmetry about a longitudinal axis of symmetry. The peripheral face of the first transmission gear 31 is curved inwards. Thus, the diameter and the perimeter of the centre of the transmission gear are smaller than the nominal diameter and the perimeter of the ends of the first transmission gear 31. Preferably, the nominal perimeter and the diameter at the two ends of the first transmission gear 31 are preferably identical respectively. The length of the first transmission gear 31 is preferably greater than the nominal diameter of the first transmission gear 31.

The concave peripheral face allows the radial gear-wheel 29 to engage with the first transmission gear 31, regardless of the inclination of the karussel 1. Thus, the substantially spherical toothing 32 has a concave shape. The curvature of the face is chosen to cooperate with the radius and inclination of the radial gear-wheel 29. Thus, regardless of the inclination of the karussel, the first transmission gear 31 meshes with the radial gear-wheel 29. Each tooth is curved towards the interior of the first transmission gear 31 and has an identical radius of curvature. Such a concave spherical cut promotes cohesion with the radial gear-wheel 29, regardless of the orientation of the radial gear-wheel 29 with the first transmission gear 31

The first transmission gear 31 further comprises a straight cut. Thus, the first transmission gear 31 has a double cut, which is a combination of a concave spherical cut and a straight cut. A straight cut means that the teeth have an identical profile over the entire height of the tooth. A double cut is obtained by making a first concave spherical cut, in order to obtain teeth curved towards the interior of the first transmission gear 31. The resulting teeth have a variable profile over the height of the tooth, the teeth being thicker at the ends. A second, straight cut is then made, in particular at the thick ends of the teeth, to obtain teeth with a substantially identical profile at the ends.

Thus, the first transmission gear 31 comprises a zone 23 where the teeth are straight. The zone 23 is arranged above the substantially spherical toothing 32 around the entire circumference of the first transmission gear 31. This zone 23 promotes cohesion with the gearing wheel 20.

The gearing wheel 20 comprises an inclined toothing 83 so as to cooperate with the zone 23 of the first transmission gear 31, the first transmission gear 31 being inclined relative to the axis of the gearing wheel 20.

As a result, the gearing wheel 20 does not change its plane, such that the inclined cut 83 thereof cooperates effectively with the zone 23 of the first transmission gear 31, which is itself inclined The radial gear-wheel 29 has a peripheral toothing configured to cooperate with the straight teeth of the zone 23 of the first transmission gear 31. In order to improve the meshing with the first transmission gear 31, the radial gear-wheel 29 comprises a peripheral toothing 34 that is inclined relative to the plane of the radial gear-wheel 29. The radial gear-wheel 29 has a smaller diameter and perimeter at its base than the diameter and perimeter of the radial gear-wheel 29 at its upper part. The diameter and perimeter widen from the base to the upper part of the wheel.

The radial gear-wheel 29 can be inclined between a position of minimum inclination and a position of maximum inclination. In the position of minimum inclination, the peripheral toothing 34 of the radial gear-wheel 29 meshes with the substantially spherical toothing 32 of the first transmission gear 31 at a lower end of the first transmission gear 31, whereas in the position of maximum inclination, the peripheral toothing 34 of the radial gear-wheel 29 meshes with the substantially spherical toothing 32 of the first transmission gear 31 at an upper end of the first transmission gear 31.

For the karussel 1, the variable adjustment means 30 include a second transmission gear 35 arranged on the plate, the second transmission gear 35 being capable of rotating relative to the plate. The second transmission gear 35 is configured to restrain the karussel carriage 2 of the regulating member via an external toothing 36 of the karussel carriage 2. The external toothing 36 is arranged on the periphery of the upper support 8, with the teeth extending radially away from the karussel carriage 2. Thus, the second transmission gear 35 restrains the rotary motion of the karussel carriage 2, such that the karussel carriage 2 rotates about its axis of rotation at a predefined speed, and thus prevents it from rotating too quickly. The rotary motion of the second transmission gear 35 about its axis of rotation is itself restrained by the drive means of the movement.

The second transmission gear 35 is preferably similar or even identical to the first transmission gear 31, whereby the second transmission gear 35 further comprises a substantially spherical toothing 37 and straight-cut teeth 70. The straight-cut teeth 70 are arranged beneath the substantially spherical toothing 37.

Figure 5:
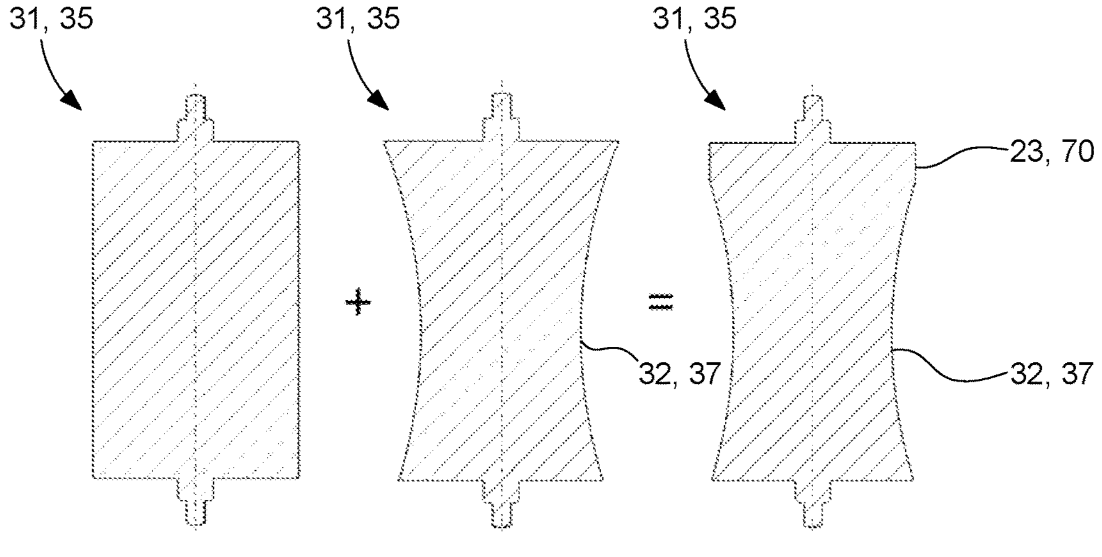

In FIG. 5, the first or the second transmission gear 31, 35, is cut in two different ways. Starting from a transmission gear blank, a first cut is made to produce a substantially spherical toothing 32, 37. A second straight cut is made to obtain the final transmission gear 31, 35, shown on the right. A straight cut results in teeth with the same profile over the entire height of the straight-cut zone. The straight cut thus forms the zones 23, 70 with straight teeth.

The two transmission gears 31, 35 are arranged on either side of the karussel carriage 2. The first transmission gear 31 is inclined on the plate, whereas the second transmission gear 35 is substantially perpendicular to the plate. The second transmission gear 35 is disposed higher up than the first transmission gear 31. More specifically, the second transmission gear 35 cooperates with the wheel of the upper support 8, which is disposed in the upper part of the karussel carriage 2, whereas the first transmission gear 31 cooperates with the radial gear-wheel 29, which is disposed in the lower part of the karussel carriage 2.

In the upright position, the upper support 8 meshes with the top of the second transmission gear 35, whereas the radial gear-wheel 29 meshes with the bottom of the first transmission gear 31. In the inclined position, the upper support 8 meshes with the bottom of the second transmission gear 35, whereas the radial gear-wheel 29 meshes with the top of the first transmission gear 31.

In the karussel 1, the two transmission gears 31, 35 rotate simultaneously, the first transmission gear 31 is rotated by the drive means, via the gear train 98, as shown in FIGS. 6 to 9, whereas the second transmission gear 35 is driven by the motion of the karussel carriage 2, and is restrained by the drive means.

To this end, the drive means include a crown 38 with an internal toothing 24, shown in FIGS. 6 to 9. The crown 38 is arranged around the karussel carriage 2 so that it can restrain the second transmission gear 35 when the second transmission gear 35 rotates, the crown 38 rotating about the karussel carriage 2. Thus, by restraining the second transmission gear 35, the crown 38 allows the motion of the karussel carriage 2 to be controlled, and also allows the escapement and the movement of the balance to be actuated. The crown 38 meshes with the straight-cut teeth 70 of the second transmission gear 35. The crown further comprises an external toothing 92, configured to mesh with a gear-wheel 93 of the gear train 98.

Figure 11:
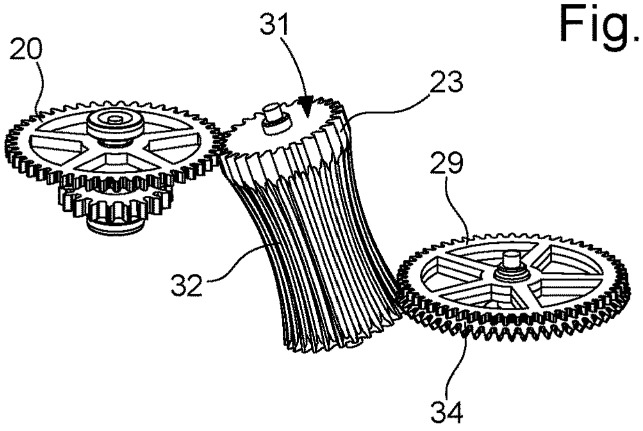

The drive means include a gearing wheel 20 of the first transmission gear 31, shown in FIG. 11, the gearing wheel 20 further being actuated by the gear train 98.

Moreover, the variable adjustment means 30 for variably adjusting the inclination of the regulating member comprise an inclining bridge 7 on which the karussel carriage 2 is mounted, the ball bearing 6 being arranged between the karussel carriage 2 and the inclining bridge 7. The bridge can be inclined to allow the regulating member to be inclined. The inclining bridge 7 is arranged beneath the karussel carriage 2, above the first axial pinion 18 and the radial gear-wheel 29. The inclining bridge 7 is mounted such that it can rotate about an axis of rotation $D_1$ passing through the karussel carriage 2, the axis of rotation $D_1$ being parallel to the inclining bridge 7, and preferably parallel to the plane of the plate. The inclining bridge 7 includes two external pivots 42, 43 arranged symmetrically on either side of the karussel carriage 2, each pivot 42, 43 extending from a post arranged at the end of the inclining bridge 7.

The pivots 42, 43 each cooperate with a bearing 39, 41 of the plate, the pivots 42, 43 being arranged along the axis of rotation $D_1$ of the inclining bridge 7. Each bearing 39, 41 comprises a hole for inserting the pivot 42, 43. The two pivots 42, 43 can rotate inside each bearing 39, 41. Thus, the inclining bridge 7 can rotate about the axis of rotation $D_1$ by means of the pivots 42, 43 and the bearings 39, 41.

The variable adjustment means 30 include a wheel 44 mounted such that it is integral with the inclining bridge 7, the actuation of the wheel 44 causing the inclining bridge 7 to incline. The wheel 44 comprises an inclining toothing 45 disposed around one of the pivots 42, 43, the inclining toothing 45 extending parallel to the axis of rotation $D_1$ of the inclining bridge 7. The inclining toothing 45 cooperates with actuating means. The actuating means mesh with the wheel 44, such that the inclining bridge 7 rotates about the axis of rotation $D_1$.

Figure 6:
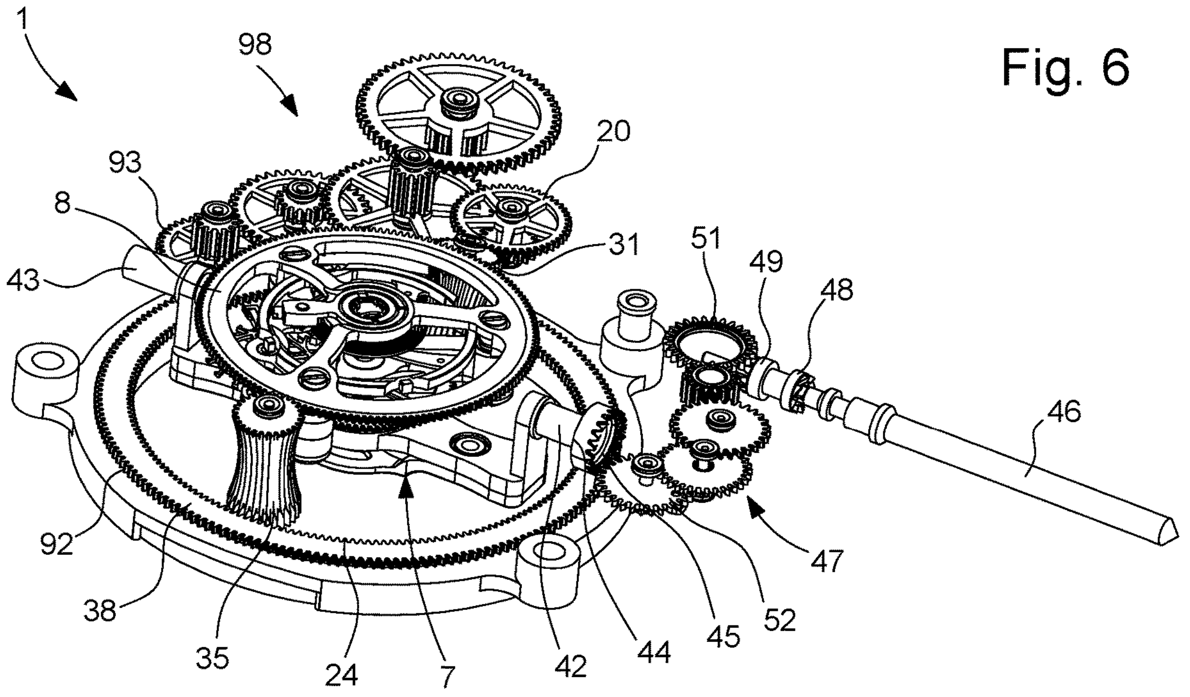
Figure 7:
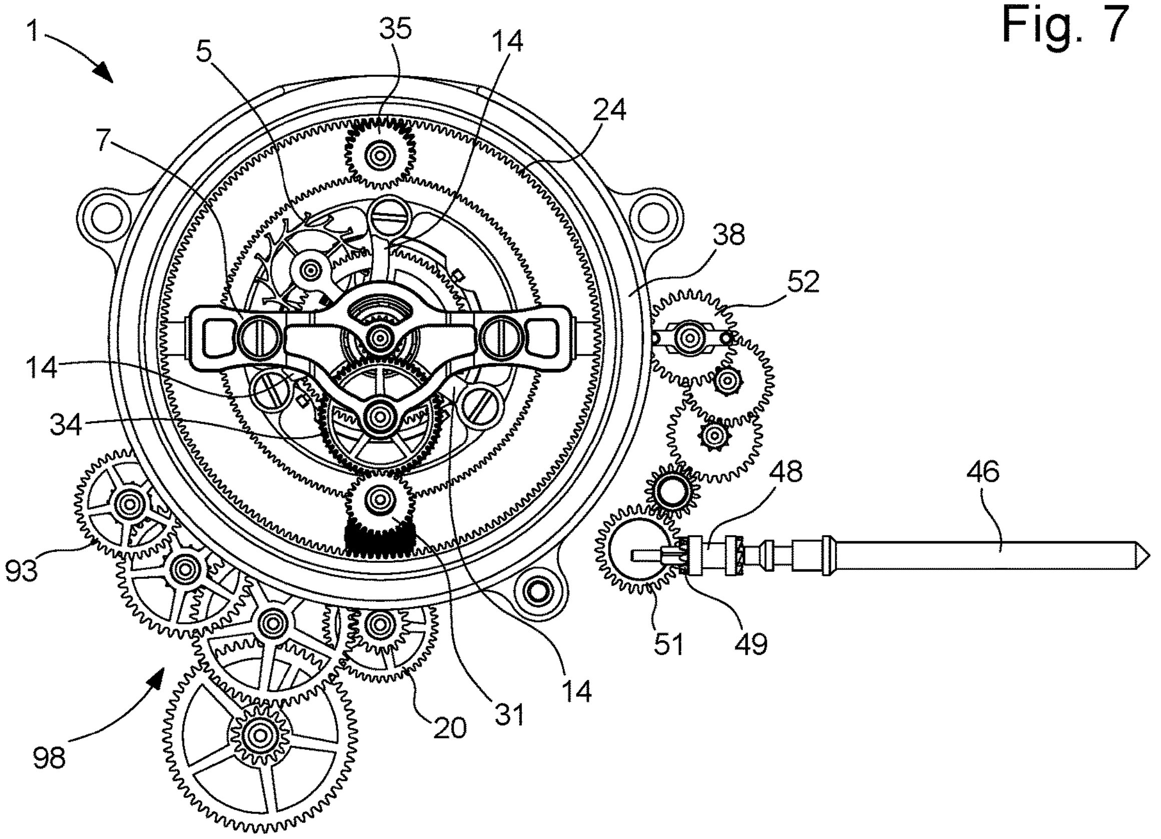
Figure 8:
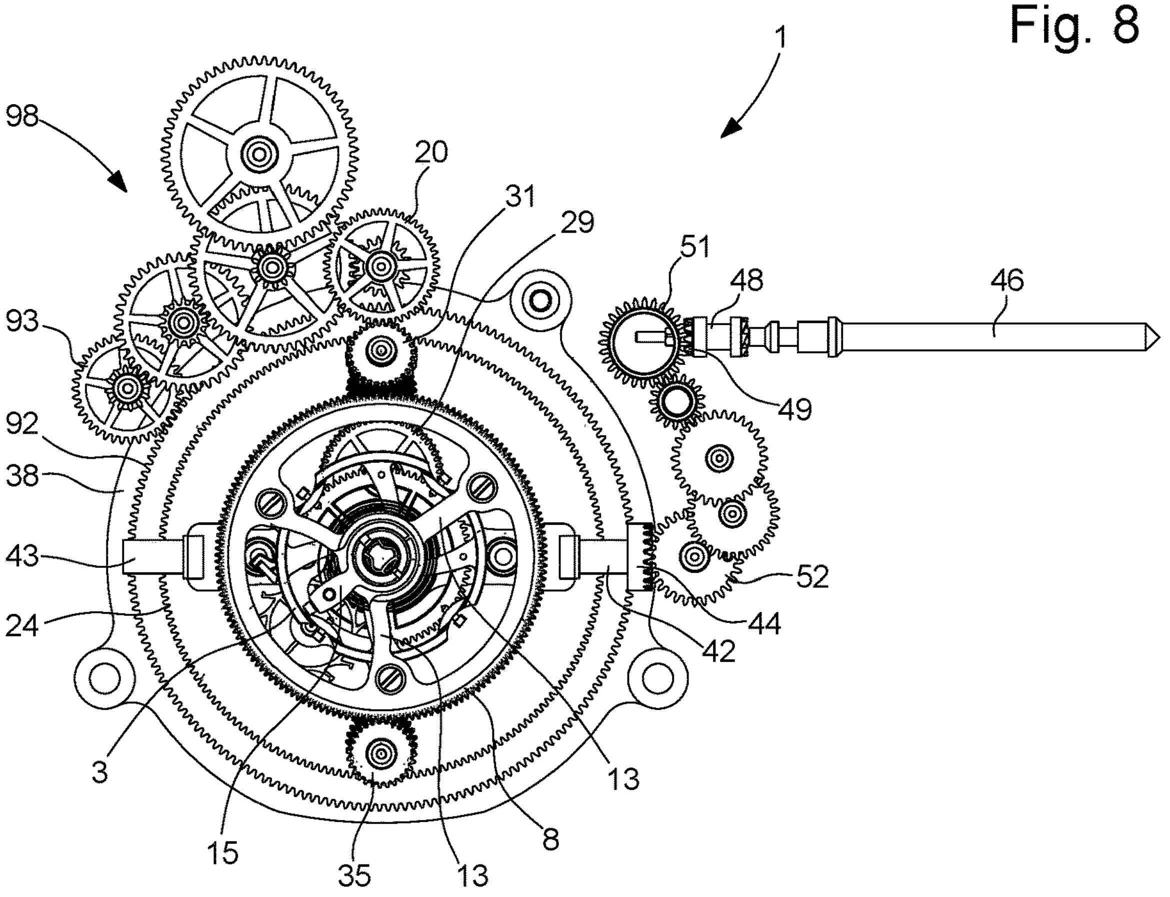
Figure 9:
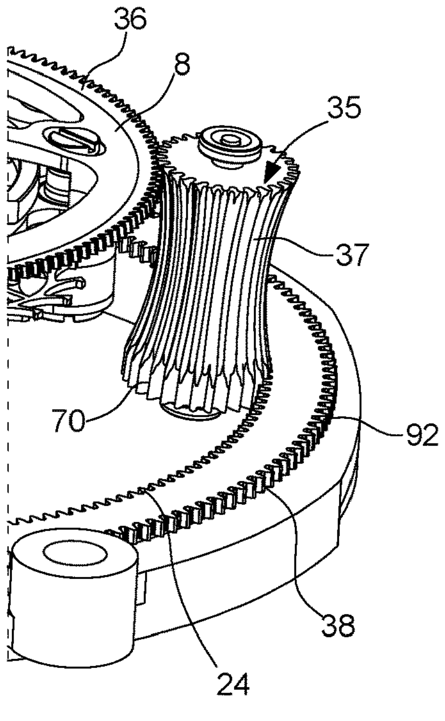

FIGS. 6 to 8 show the inclination actuating means, which include a rod 46 and a gear train 47. The rod 46 is, for example, actuated by a crown, not shown in the figures. The rod 46 is provided with a pinion 48 comprising a peripheral toothing 49, which meshes with a transmission gear 51 actuating the gear train 47. The gear train 47 comprises a series of gear-wheels and pinions, which are actuated by the transmission gear 51 to transmit the rotational force received by the rod 46 to the inclining bridge 7. A last wheel 52 of the gear train meshes with the toothing 45 of the wheel 44 mounted such that it is integral with the inclining bridge 7. Thus, by rotating the rod 46 about the axis thereof, the gear train is actuated up to the wheel 44, which inclines the inclining bridge 7 at a selected angle.

Other embodiments of the actuating means can be considered, for example, positioning in jumps.

Figure 10:
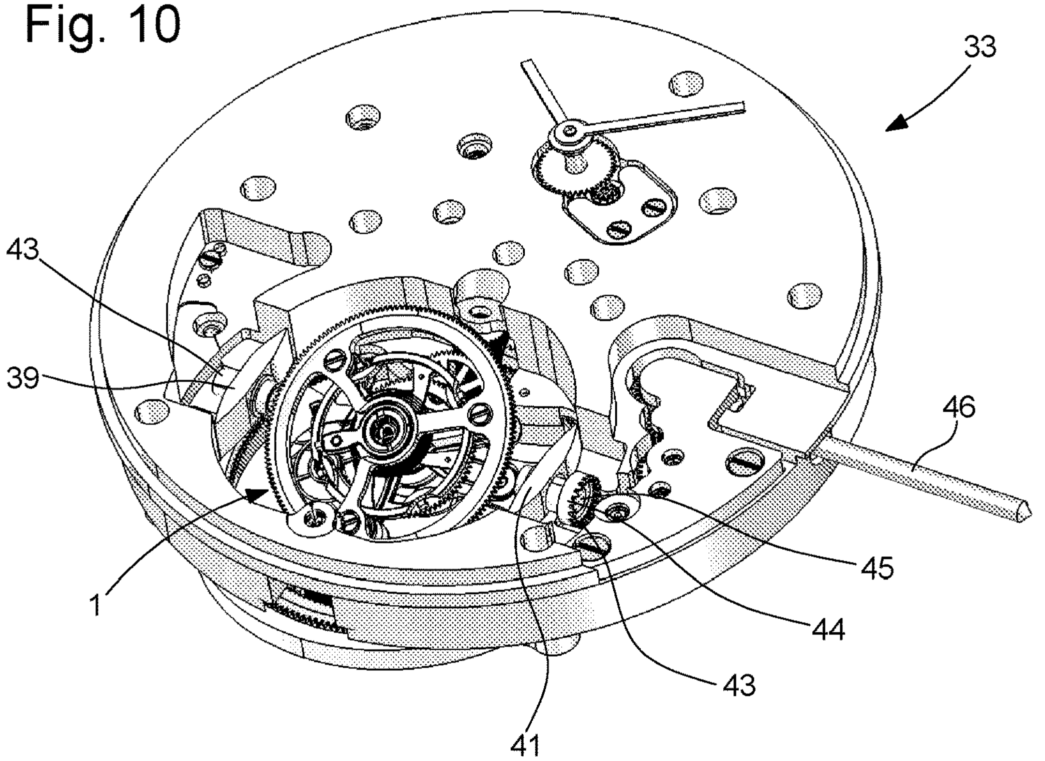

FIG. 10 shows a plate 33 provided with the karussel and the actuating means. The rod 46 extends outside of the plate so that the inclination of the regulating member can be actuated and modified. The plate 33 comprises a recess in which the regulating member is arranged.

FIG. 11 shows an assembly comprising the first transmission gear 31 and the radial gear-wheel 29. The radial gear-wheel 29 and the transmission gear 31 cooperate in such a way that the radial gear-wheel 29 can be inclined, while maintaining an equal amount of meshing between the transmission gear and the gear-wheel. This means that the ability to transmit rotary motion from one to the other is the same, regardless of the inclination of the gear-wheel, within the defined operating range between the minimum and maximum inclination.

Figure 12:
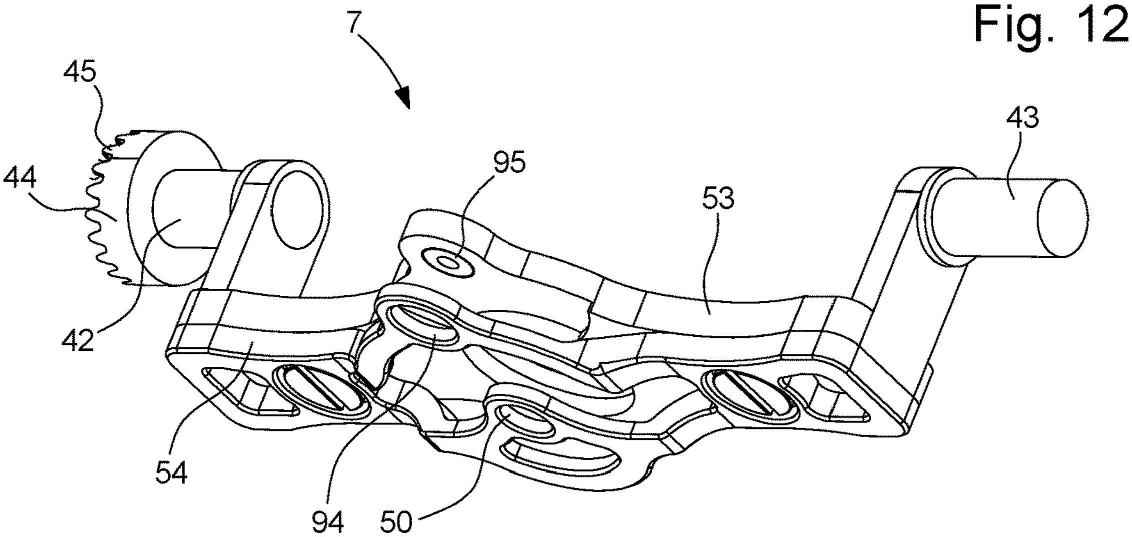
Figure 13:
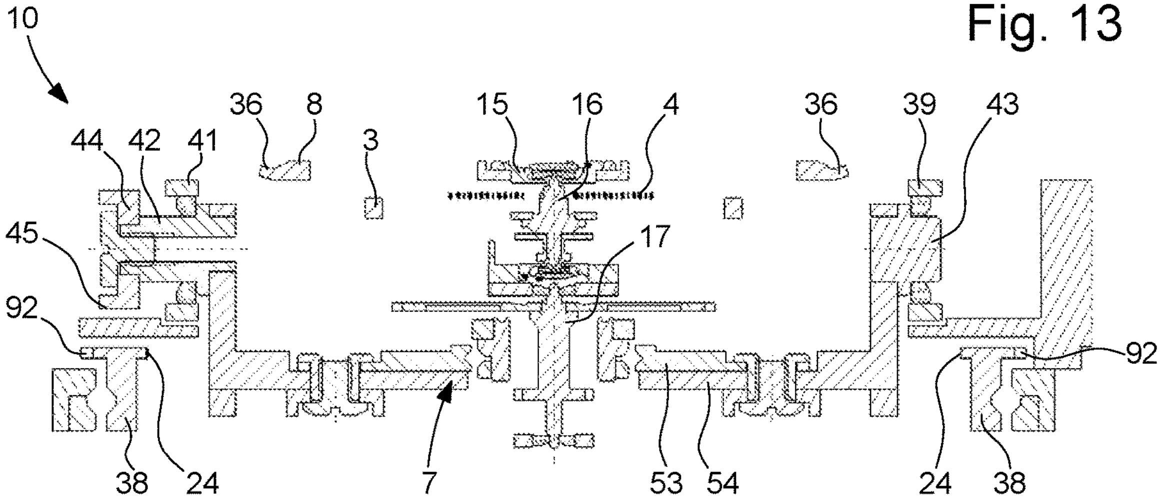

In FIGS. 12 and 13, the inclining bridge 7 comprises a longitudinal main platform 53, at the ends whereof the posts of the pivots 42, 43 are disposed. The platform 53 comprises a central hole to allow for the passage of the second axial staff 17. The main platform comprises an eccentric bearing 95 for receiving the fifth radial staff 28.

The inclining bridge 7 comprises a secondary platform 54 arranged beneath the main platform 53. The secondary platform 54 comprises a first bearing 50 arranged to receive the second axial staff 17. The first bearing 50 is arranged in line with the central hole of the main platform 53. The secondary platform 54 comprises a second eccentric bearing 94 for receiving the fifth radial staff 28, the second bearing 94 being arranged in line with the eccentric bearing of the main platform 53. Thus, the fifth radial staff 28 is held between the main platform 53 and the secondary platform 54.

The ball bearing is fitted into the central hole and held in a recess arranged between the main platform 53 and the secondary platform 54.

In a second embodiment of the invention, shown in FIGS. 14 to 22, the regulating member is a tourbillon 10. The invention does not specifically relate to the intrinsic features and operation of a tourbillon, which are known to a person skilled in the art.

The tourbillon 10 includes a movable carriage 55 inside which the inertial mass 56, the guide, the elastic return element 68 and the escapement mechanism 69 are arranged.

The tourbillon carriage 55 is mounted such that it rotates about an axis of rotation by means of a ball bearing 60 arranged between the tourbillon carriage 55 and an inclining bridge 57 on which the tourbillon carriage 55 is mounted.

The tourbillon carriage 55 comprises an upper support 58 and a lower support 59, which are assembled by screws inserted into posts 61, of which there are two. The mechanical resonator with the inertial mass 56, the guide and the elastic return element, as well as the escapement mechanism are suspended between the upper support 58 and the lower support 59. The upper support 58 and the lower support 59 are each shaped like a cross with two branches 63, 64 intersecting at a crossing 65. The two supports 58, 59 are disposed parallel to one another, one above the other. Two posts 61, 62 connect the two supports 58, 59 to one another, each post 61, 62 connecting one end of a branch 63 of one support 58 to the end of the corresponding branch of the other support 58, 59. The two ends of the other branch each support a bearing of a staff of the tourbillon, the staff of the inertial mass for one, and the staff of the escape wheel for the other. The posts 61, 62 are assembled by screws 66 to the two supports 58, 59.

Figure 16:
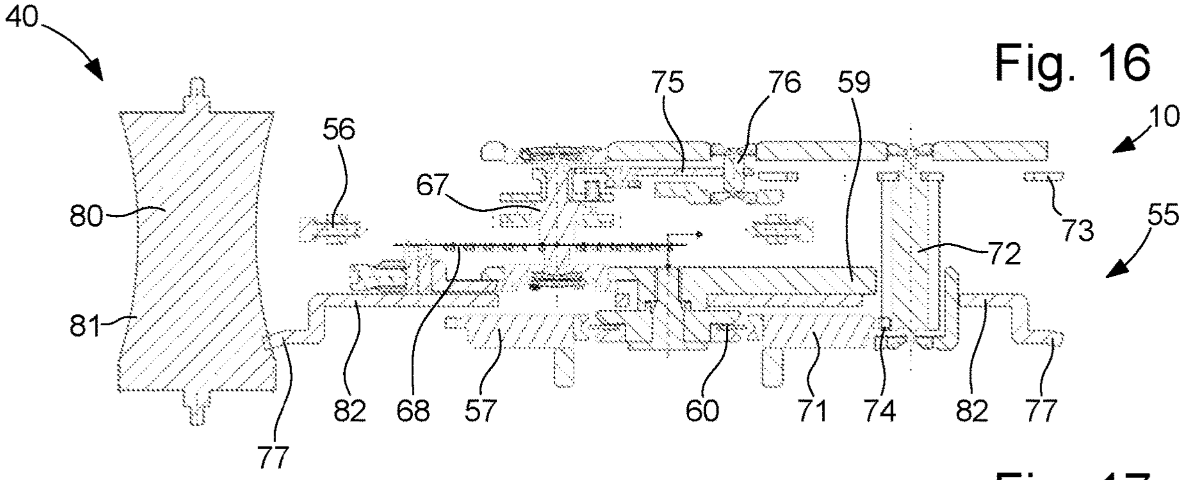
Figure 17:
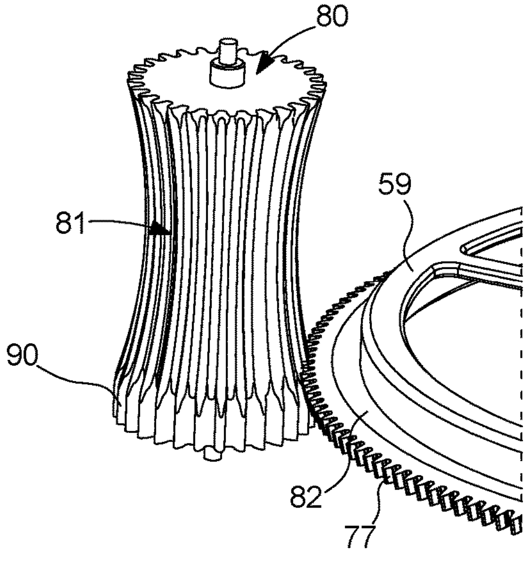
Figure 18:
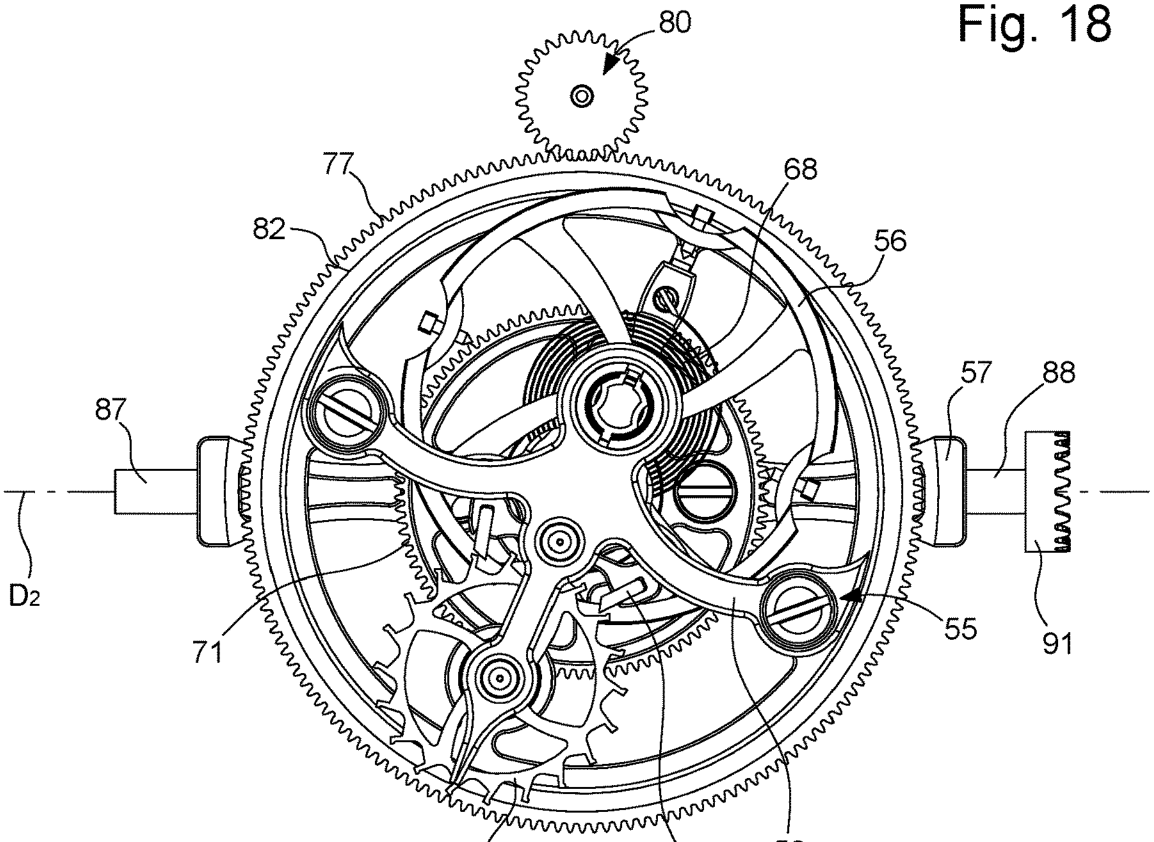
Figure 19:
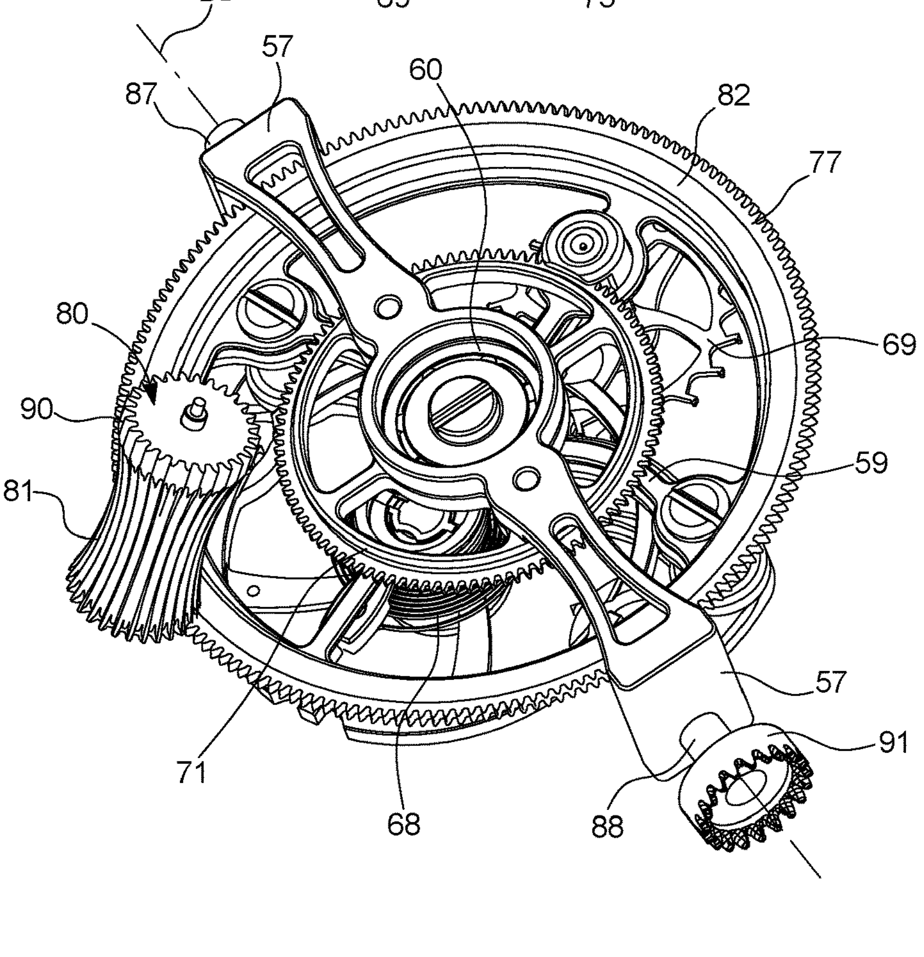
Figure 20:
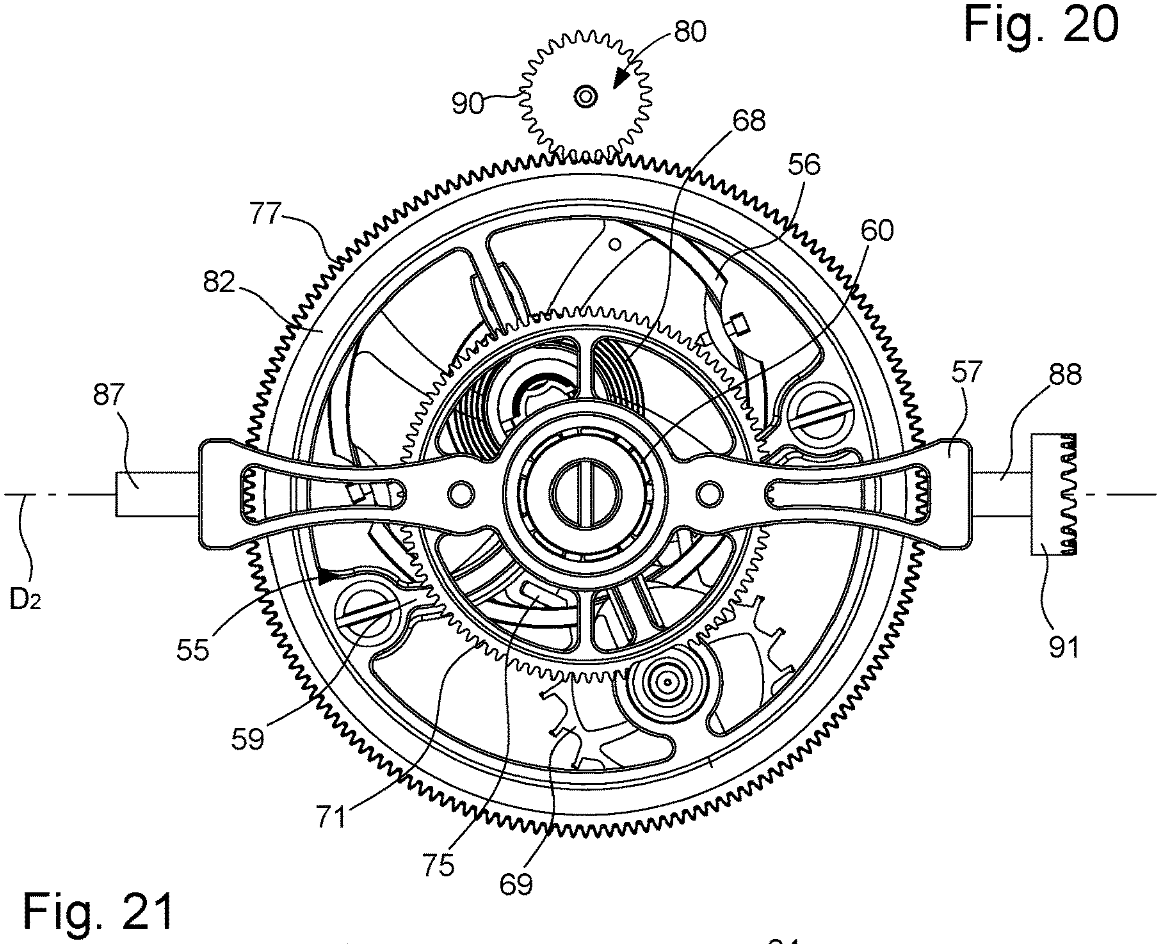

In FIG. 16, the inertial mass 56 is an annular balance arranged on a first radial staff 67 disposed radially parallel to the rotating staff of the tourbillon carriage 55. The balance is off-centre and disposed halfway up the tourbillon carriage 55. The balance is configured to perform a rotary oscillatory motion about the first radial staff 67 within the tourbillon carriage 55 at a predetermined frequency.

A second radial staff 72 is arranged in the tourbillon carriage 55, the second radial staff 72 carrying an escape wheel 73, which is disposed above an escape pinion 74 also carried by the second radial staff 72. The second radial staff 72 is parallel to the axis of rotation of the tourbillon carriage 55 and to the first radial staff 67. The escape pinion 74 projects beneath the tourbillon carriage 55 in an off-centre position.

The escape wheel 73 is disposed in the upper part of the tourbillon carriage 55 so that it is visible from the outside. The escape wheel 73 cooperates with a Swiss lever 75 disposed perpendicularly between the first radial staff 67 and the periphery of the escape wheel 73. The lever 75 comprises an elongate body with a fork at a first end, the fork being configured to cooperate with a pin of the first radial staff 67, which is linked to the movement of the balance. The second end of the lever includes two pallets arranged to cooperate with the escape wheel 73, alternately blocking the rotation thereof, so as to cause it to rotate in steps. The lever 75 is carried by a third radial staff 76 arranged in the tourbillon carriage 55 between the first radial staff 67 and the second radial staff 72.

A seconds wheel 71 is disposed axially beneath the tourbillon carriage 55, between the inclining bridge 57 and the tourbillon carriage 55. This seconds wheel 71 does not rotate with the tourbillon carriage 55, and is integral with the inclining bridge 57. The seconds wheel 71 meshes with the escape pinion 74 arranged on the second radial staff 72. The seconds wheel 71 is capable of moving relative to the plate with the inclining bridge 57.

Thus, by rotating the tourbillon carriage 55 about the axis of rotation thereof, the escape pinion 74 is caused to rotate by the seconds wheel 71, such that the escape wheel 73, the lever 75 and the movement of the balance are actuated.

Figure 14:
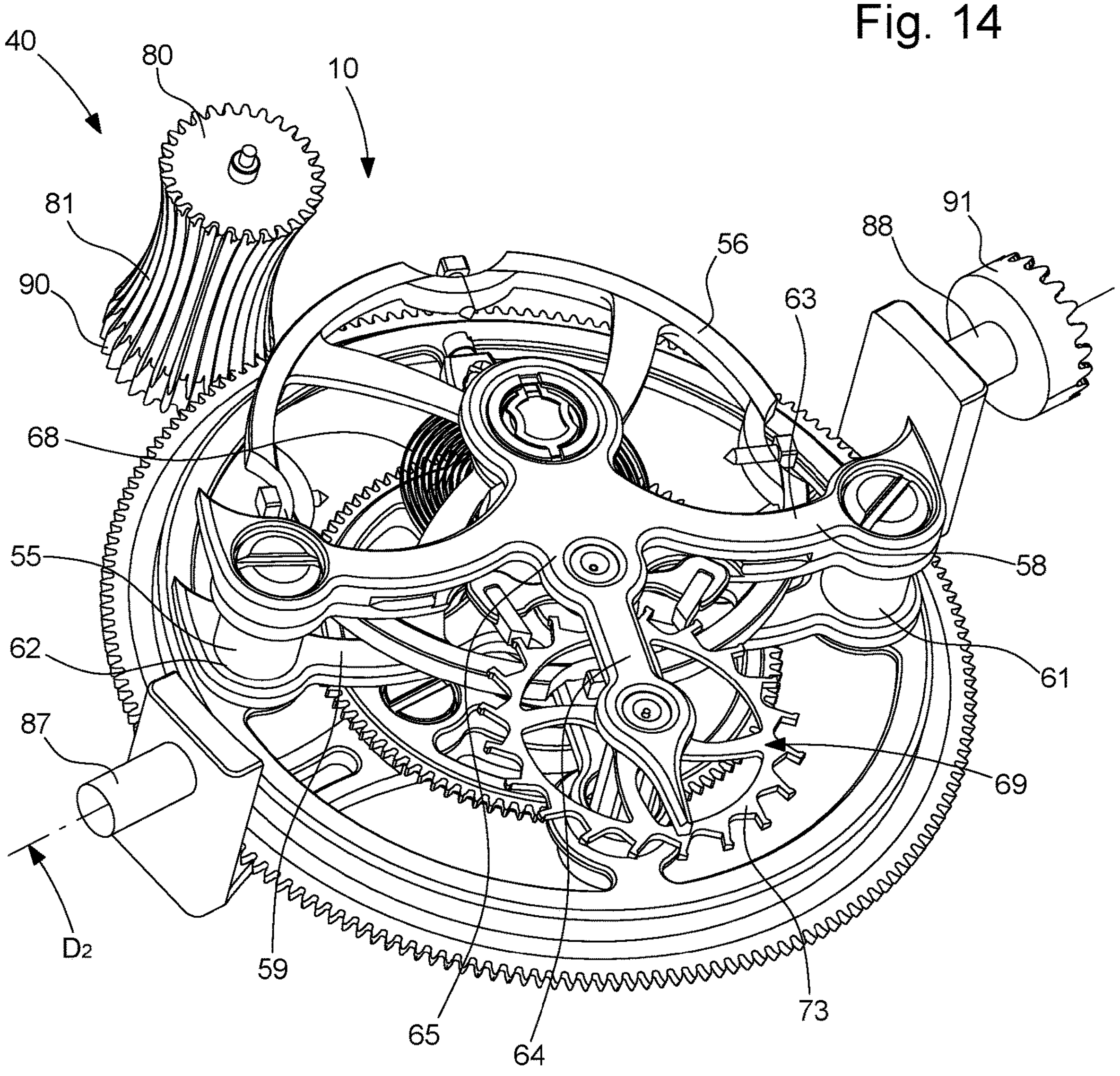
Figure 15:
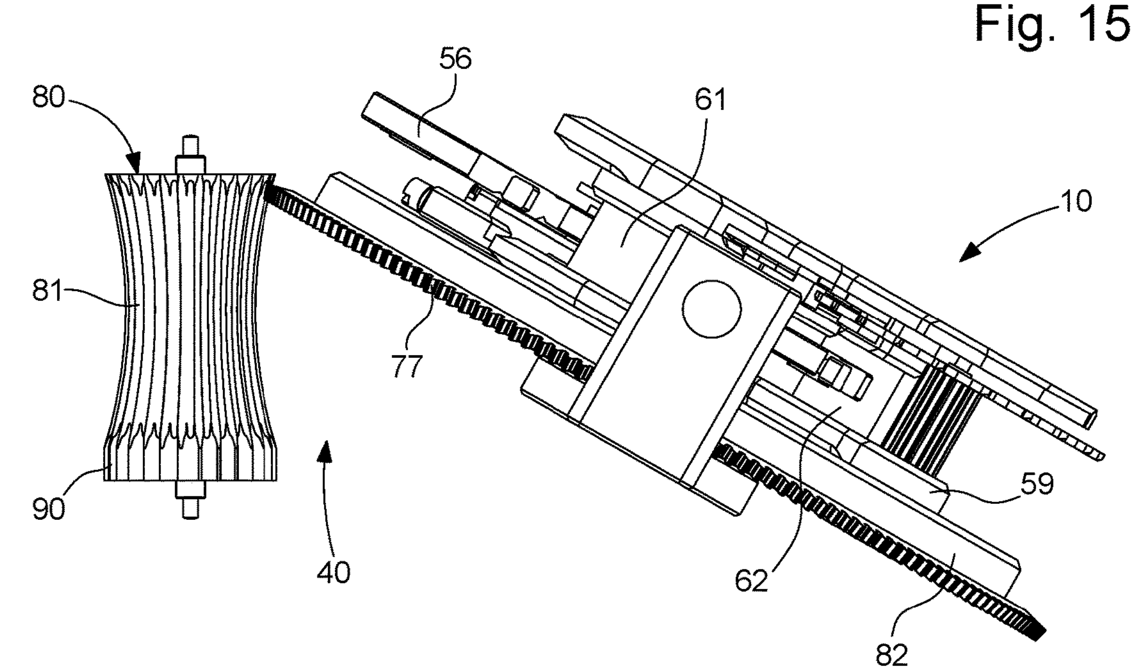

According to the invention, the horological movement comprises variable adjustment means 40 for variably adjusting the inclination of the tourbillon 10 relative to the plate, such that the second plane of the inertial mass forms an angle of variable value with the first plane of the plate, as shown in FIGS. 14 and 15. Thus, the tourbillon 10 can be displaced between a straight position in which the second plane of the inertial mass is substantially parallel to the first plane of the plate, and an oblique position in which the second plane of the inertial mass forms an angle with the first plane of the plate.

The angle of inclination can be modified by the variable inclination adjustment means 40. The variable adjustment means 40 allow the angle of inclination of the regulating member to be modified relative to the plate in a range of 0° to 90°. Thus, for 0°, the balance of the regulating member is parallel to the first plane of the plate, whereas at 90°, the regulating member is substantially perpendicular to the plate. Preferably the range is from 0° to 45°, with the regulating member being oblique to the first plane of the plate. By means of the variable adjustment means 40, the angle can take any value between the two extreme values.

In FIG. 14, the minimum angle is substantially 0°, whereas in FIG. 15, the maximum angle is 30°. In this embodiment, the maximum angle is 30°.

The variable adjustment means 40 include a transmission gear 80 arranged on the plate, the transmission gear 80 being capable of rotating relative to the plate thanks to the drive means, the transmission gear 80 comprising a substantially spherical toothing 81 configured to mesh with the tourbillon carriage 55 to actuate it.

The tourbillon carriage 55 comprises a peripheral toothing 77 arranged on the lower support 59. The lower support 59 comprises an external ring 82 carrying the peripheral toothing 77. Thus, by engaging the external ring 82, the tourbillon carriage 55 rotates about the axis thereof.

The transmission gear 80 is similar or even identical to those described in the karussel. It has a cylindrical shape and the toothing 81 on the peripheral face thereof is concave to allow the peripheral toothing 77 of the external ring 82 to engage with the transmission gear 80, regardless of the inclination of the tourbillon 10.

For example, the toothing 81 of the transmission gear 80 has double-cut teeth, which is a combination of a concave spherical cut and a straight cut. A concave spherical cut promotes cohesion with the tourbillon carriage 55, regardless of the orientation of the tourbillon carriage 55 relative to the transmission gear 80. The straight cut means that the teeth of the transmission gear are substantially equal in width over the straight cut zone. Thus, the transmission gear 80 comprises a zone 90 with straight teeth so as to be able to cooperate with a gearing wheel.

Moreover, the peripheral toothing 77 of the external ring 82 is preferably inclined relative to the plane of the external ring 82 so as to cooperate with the transmission gear 80.

Unlike the karussel of the first embodiment, the variable adjustment means 40 comprise a single transmission gear 80, which only drives the tourbillon carriage 55 of the tourbillon 10 to actuate the escapement mechanism. The escape pinion 74 is actuated by the motion of the tourbillon carriage 55 and by the stressing of the fixed wheel 71. In other words, the escapement mechanism is arranged in series with the tourbillon carriage 55, relative to the drive means.

A device similar to the karussel is used to drive the transmission gear 80. For example, the variable adjustment means 40 include a gearing wheel of the first transmission gear actuated by the gear train. Alternatively, a crown similar to that actuating the second transmission gear of the karussel could be used to actuate the transmission gear of the tourbillon.

Figure 21:
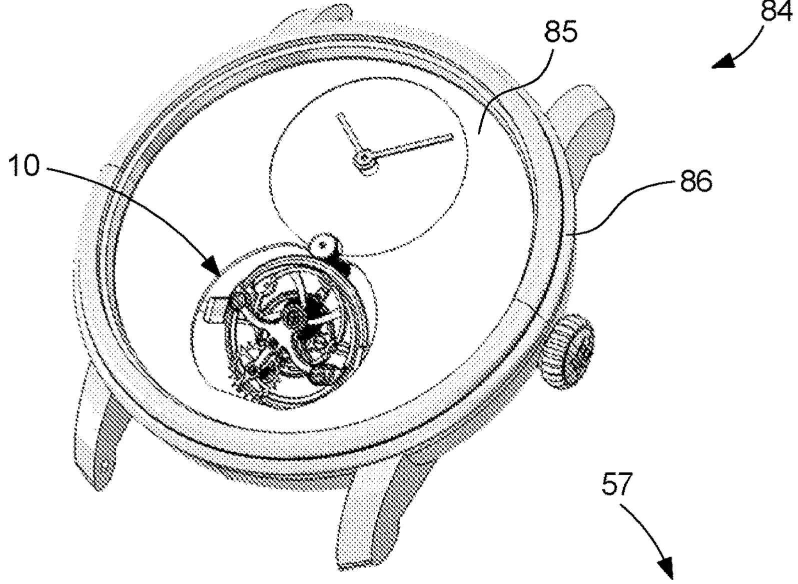
Figure 22:
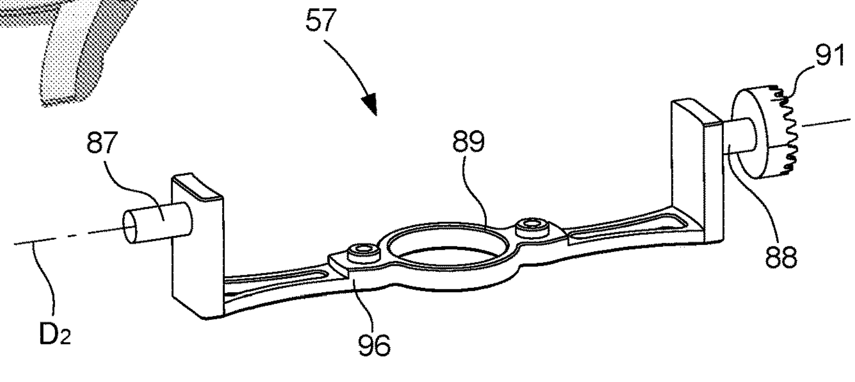

FIG. 21 shows a timepiece 84 provided with a case 86 and a dial 85 over which hands move. The timepiece comprises a recess for the tourbillon 10, the dial 85 being pierced to allow the inclining tourbillon 10 to be viewed.

The variable adjustment means 40 for variably adjusting the inclination of the tourbillon 10 comprise the inclining bridge 57 (shown in FIG. 22) and on which the tourbillon carriage 55 is mounted, the ball bearing 60 being arranged between the tourbillon carriage 55 and the inclining bridge 57. The inclining bridge 57 is capable of inclining in order to select the inclination of the tourbillon 10. The inclining bridge 57 is arranged beneath the carriage, with the fixed seconds wheel 71 arranged between the inclining bridge 57 and the tourbillon carriage 55.

The inclining bridge 57 is mounted such that it can rotate about an axis of rotation $D_2$ passing through the tourbillon carriage 55, the axis being parallel to the inclining bridge 57, and preferably parallel to the first plane of the plate. The inclining bridge 57 comprises a longitudinal main platform 96 with a central hole 89, and posts at the ends of the platform 96. Each post comprises an external pivot 87, 88 arranged along the axis of rotation $D_2$ on either side of the tourbillon carriage 55, and cooperating with bearings of the plate (not shown). The ball bearing 60 is fitted into the central hole 89, or preferably into the seconds wheel 71.

The other features may be identical to those of the bridge of the karussel. The variable adjustment means 40 include, for example, a wheel 91 mounted such that it is integral with the inclining bridge 57, the wheel 91 being provided with an inclining toothing, the actuation of the inclining wheel 91 causing the inclining bridge 57 to incline.

The inclination actuating means are identical to those described for the embodiment of the karussel regarding the wheel mounted such that it is integral with the inclining bridge.

In a third embodiment of the invention, shown in FIGS. 23 to 28, the regulating member is a conventional regulating member 100 that can be inclined as required. The invention does not specifically relate to the intrinsic features and operation of a conventional regulating member, which are known to a person skilled in the art.

The conventional regulating member 100 includes an inertial mass 103, a guide, an elastic return element and an escapement mechanism.

In FIGS. 23 to 28, the conventional regulating member 100 includes a conventional regulating member carriage 102, inside which a mechanical resonator with an inertial mass 103, a guide and an elastic return element 104, as well as a Swiss lever 126 escapement mechanism 105 are arranged. The conventional regulating member carriage 102 is mounted such that it is integral with an inclining bridge 107.

The conventional regulating member carriage 102 comprises an upper support 108 and a lower support 109, which are assembled by screws 111 inserted into posts 112, of which there are three. The mechanical resonator with the inertial mass 103, the guide and the elastic return element, as well as the escapement mechanism are suspended between the upper support 108 and the lower support 109. The upper support 108 is a circular ring with three branches 113 connected to a central hub. The lower support 109 comprises three arms 114 extending from a central junction, the arms 114 connecting the three eccentric posts 112 to the central junction. The three posts 112 are angularly distributed around the periphery of the conventional regulating member carriage 102, so as to connect the wheel to each arm 114.

Figure 23:
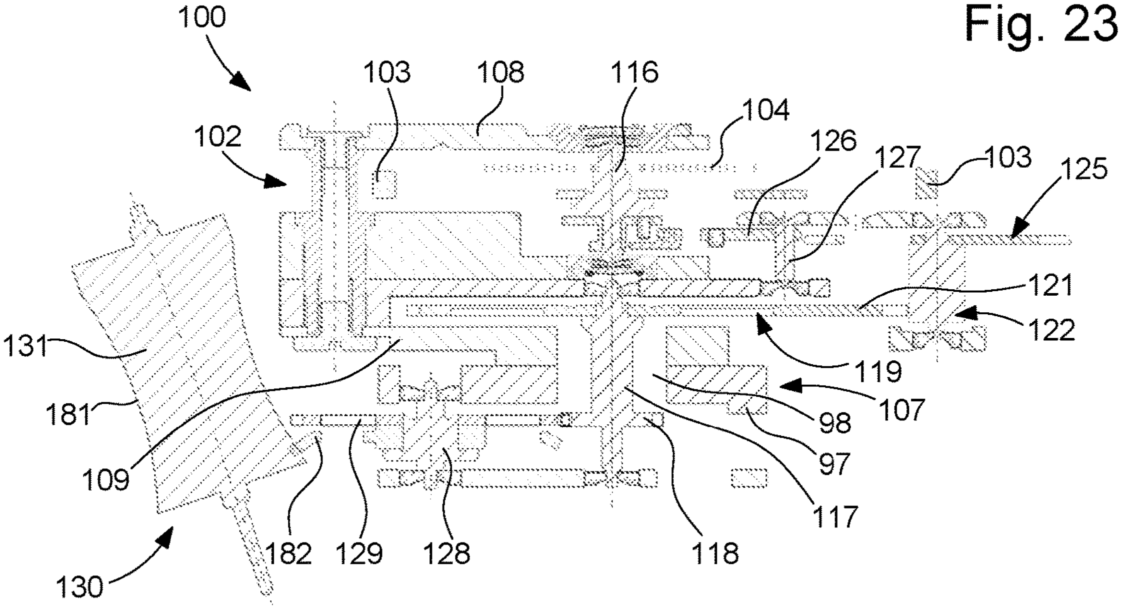

In FIG. 23, the inertial mass 103 is an annular balance arranged on a first axial staff 116 disposed in the middle of the conventional regulating member carriage 102. The balance is disposed in the upper part of the conventional regulating member carriage 102 so that it is visible from the outside. The balance is configured to perform a rotary oscillatory motion about the first axial staff 116 within the conventional regulating member carriage 102 at a predetermined frequency.

To actuate the mechanical resonator, a second axial staff 117, substantially collinear with the first axial staff 116, is disposed beneath the first axial staff 116. The second axial staff 117 partially extends beneath the conventional regulating member carriage 102 and the inclining bridge 107. A first axial pinion 118 integral with the second axial staff 117 at the centre thereof, is coaxial with the balance and is arranged beneath the conventional regulating member carriage 102.

An intermediate wheel 119 is integral with the second axial staff 117 beneath the balance in the conventional regulating member carriage 102. The intermediate wheel 119 meshes with an escape pinion 121 arranged on a third radial staff 122, which is substantially parallel to the axial staffs 116, 117. The third radial staff 122 is arranged in the conventional regulating member carriage 102. The third radial staff 122 also holds an escape wheel 125, which is disposed above the escape pinion 121. The escape wheel 125 cooperates with a Swiss lever 126 disposed perpendicularly between the first axial staff 116 and the periphery of the escape wheel 125. The lever 126 comprises an elongate body with a fork at a first end, the fork being configured to cooperate with a pin of the first axial staff 116, which is linked to the movement of the balance. The second end of the lever 126 includes two pallets arranged to cooperate with the escape wheel 125, alternately blocking the rotation thereof, so as to cause it to rotate in steps. The lever 126 is carried by a fourth radial staff 127 arranged in the conventional regulating member carriage 102 between the first axial staff 116 and the third radial staff 122.

Turning the first axial pinion 118 actuates the escape wheel 125, the lever 126 and the movement of the balance, via the intermediate wheel 119 and the escape pinion 121, which rotate the third radial staff 122.

The conventional regulating member 100 further comprises a radial gear-wheel 129 disposed beneath the conventional regulating member carriage 102, which meshes with the first axial pinion 118. The radial gear-wheel 129 is carried by a fifth radial staff 128 arranged beneath the conventional regulating member carriage 102. Actuation of the radial gear-wheel 129 causes the first axial pinion 118 to rotate.

According to the invention, the horological movement comprises variable adjustment means 130 for variably adjusting the inclination of the regulating member 100 relative to the plate, such that the rotating staff and the second plane of the inertial mass form an angle of variable inclination with the first plane of the plate. Thus, the regulating member 100 can be inclined to obtain a variable angle of inclination, the angle being capable of being selected using the variable adjustment means 130.

Preferably, the variable adjustment means 130 modify the angle of inclination of the regulating member relative to the plate in a range of 0° to 45°. Thus, for 0°, the balance of the regulating member is parallel to the first plane of the plate, whereas at 45°, the regulating member is oblique to the first plane of the plate. By means of the variable adjustment means 130, the angle can take any value between the two extreme values.

Figure 24:
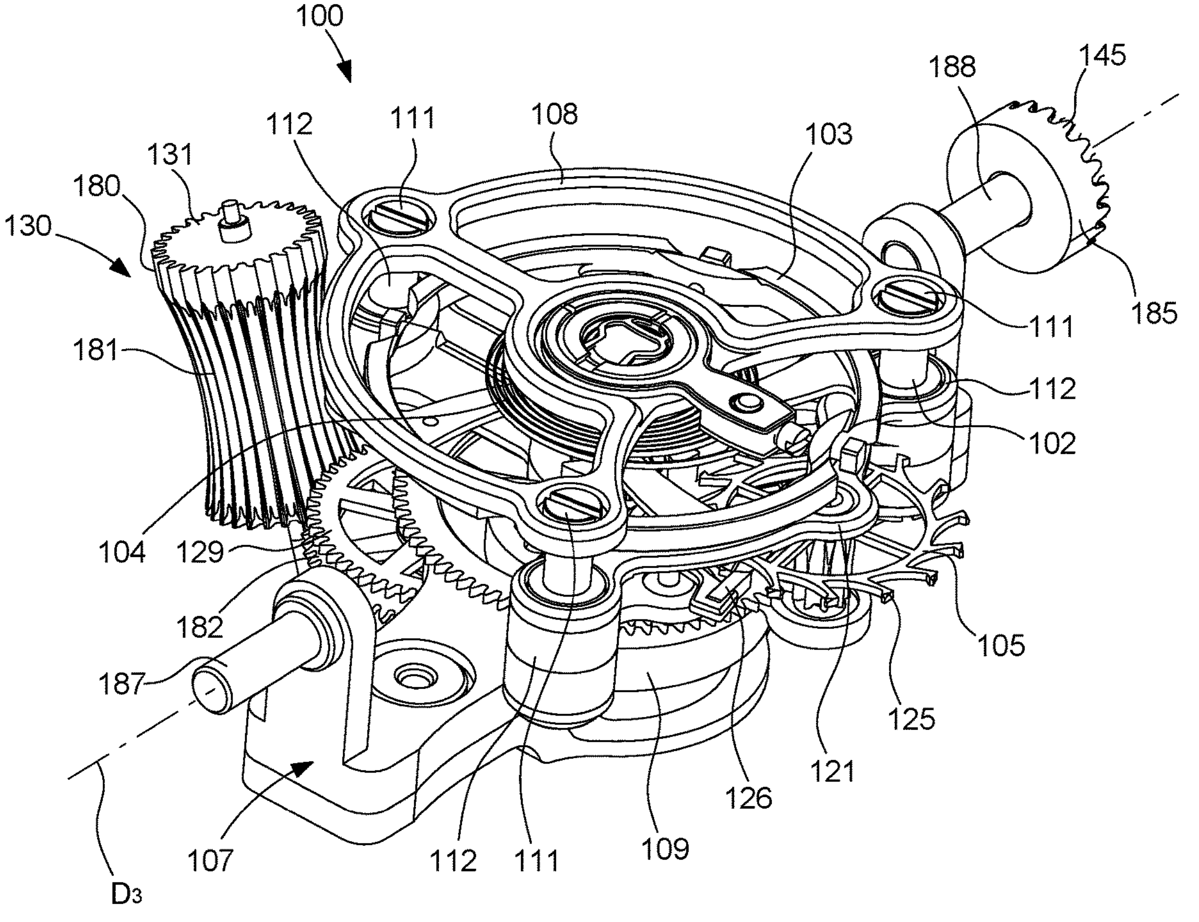
Figure 25:
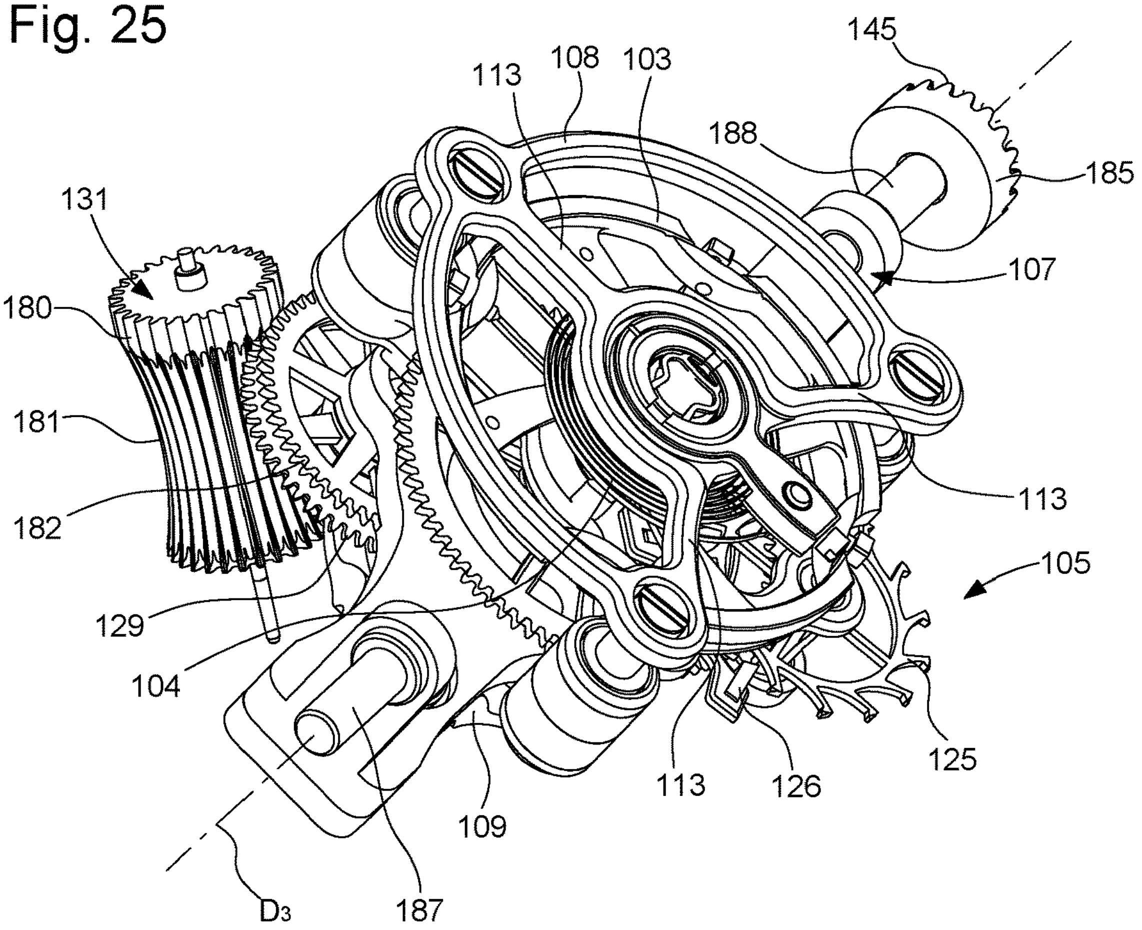
Figure 26:
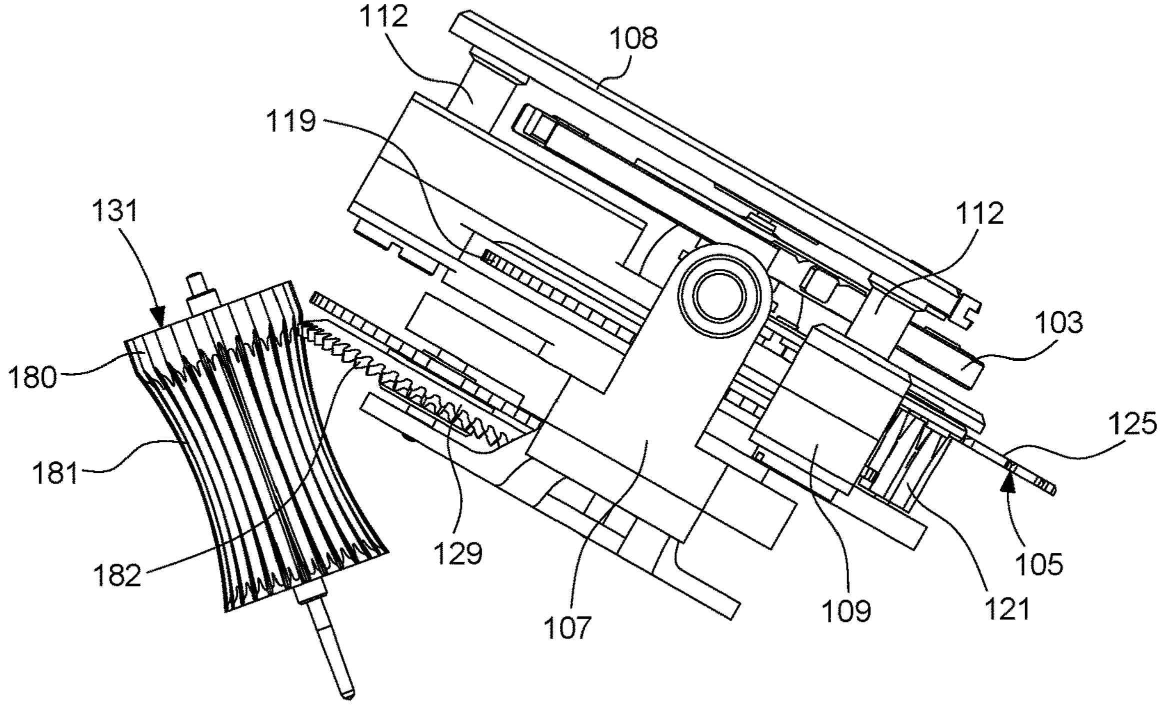
Figure 27:
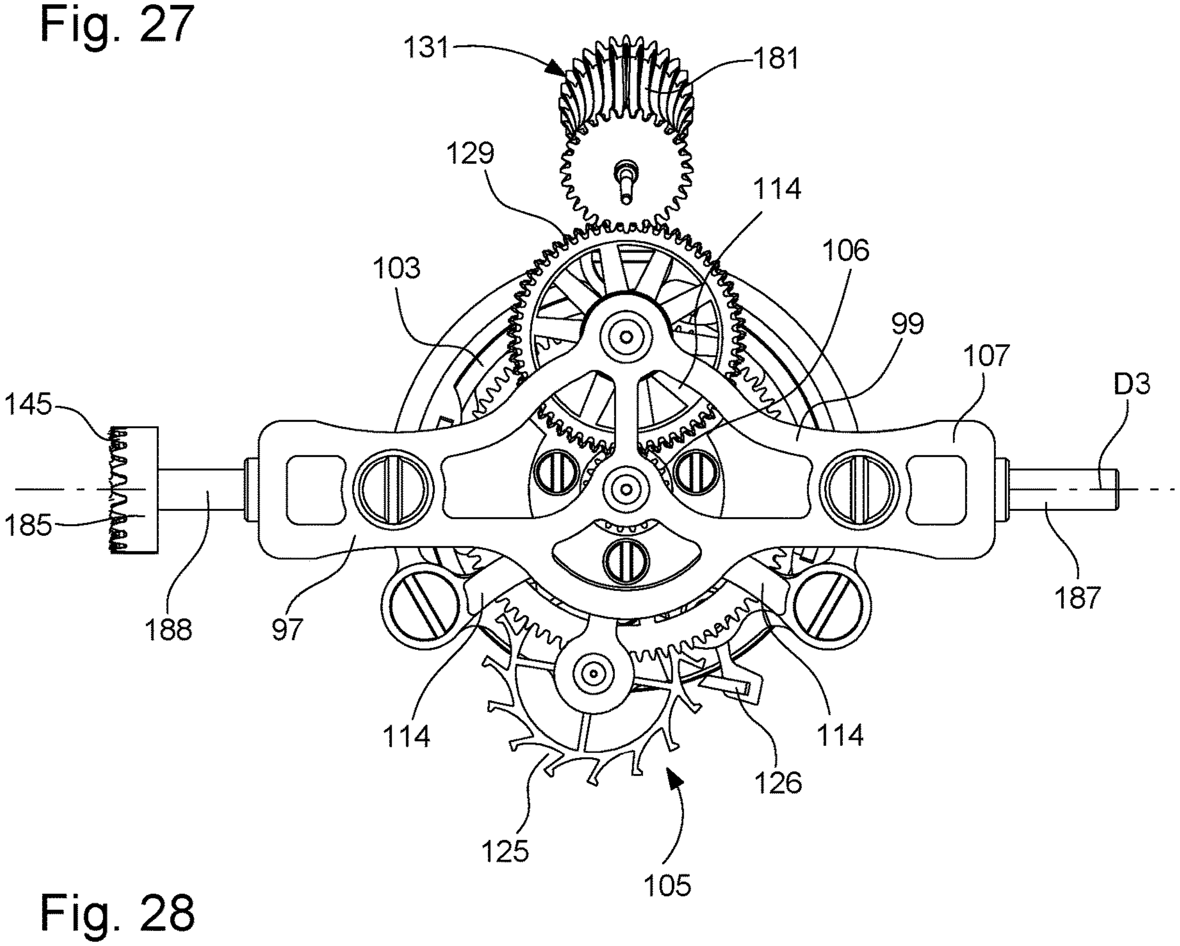
Figure 28:
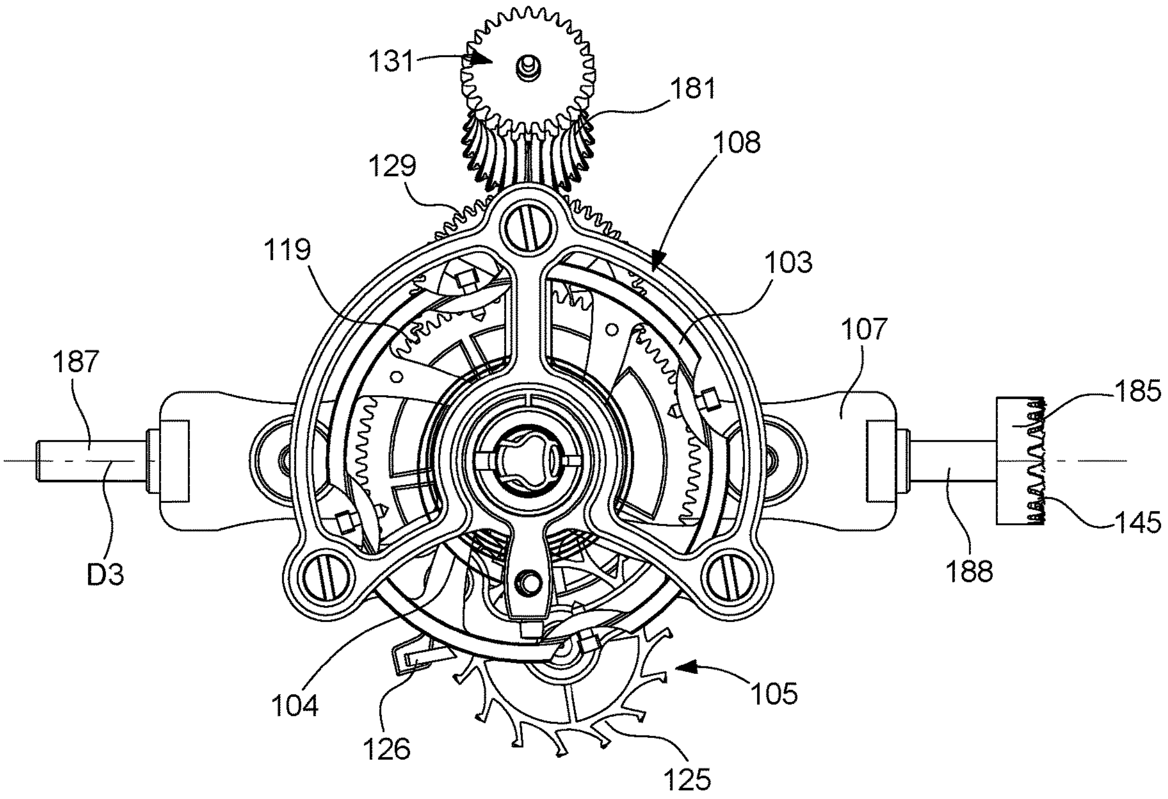

In FIG. 24, the minimum angle is substantially 0°, whereas in FIG. 25, the maximum angle is 30°. In this embodiment, the maximum angle is 30°.

In order to obtain such an adjustable inclination, the variable adjustment means 130 include a transmission gear 131 arranged on the plate. The transmission gear 131 is capable of moving in rotation relative to the plate thanks to the drive means. The transmission gear 131 comprises a substantially spherical toothing 181 configured to mesh with the radial wheel 129 of the regulating member 100 to actuate it.

The transmission gear 131 is similar or even identical to the first transmission gear of the karussel. It has a cylindrical shape and the toothing 181 on the peripheral face thereof is spherical to allow the radial gear-wheel 129 to engage with the transmission gear 131, regardless of the inclination of the conventional regulating member. Such a toothing 181 promotes cohesion with the radial gear-wheel 129, regardless of the orientation of the radial gear-wheel 129 with the transmission gear 131.

The transmission gear 131 further includes double-cut teeth, combining a concave spherical cut and a straight cut. The straight cut means that the teeth of the transmission gear 131 are substantially equal in width over the height of the straight cut zone.

Thus, the transmission gear 131 comprises a zone 180 with straight teeth so as to be able to cooperate with a gearing wheel. The zone 180 is arranged above the concave peripheral face.

Moreover, the radial gear-wheel 129 preferably comprises a peripheral toothing 182 that is inclined relative to the plane of the radial gear-wheel 129 in order to cooperate with the straight-cut teeth 180 of the transmission gear 131.

The variable adjustment means 130 comprise a single transmission gear 131, which drives the escapement mechanism only. The inclination actuating means are identical to those described for the embodiments of the karussel and of the tourbillon.

The transmission gear 131 is actuated by the drive means, via the gear train 98. To this end, the drive means include a gearing wheel which directly actuates the transmission gear 131 via the straight teeth 180, as with the first transmission gear of the karussel. Alternatively, the drive means can include an internally-toothed crown arranged around the conventional regulating member carriage 102, so as to be able to actuate the transmission gear 131 when the crown rotates about the conventional regulating member carriage 102, as with the second transmission gear of the karussel.

Thus, by rotating the transmission gear 131, the crown or the gearing wheel produces the motion of the escapement and of the balance in the conventional regulating member carriage 102 of the regulating member 100. In this embodiment of a conventional regulating member 100, the conventional regulating member carriage 102 does not move in relation to the inclining bridge 107.

The variable adjustment means 130 for variably adjusting the inclination of the regulating member 100 comprise the inclining bridge 107 on which the conventional regulating member carriage 102 is mounted. The inclining bridge 107 is capable of inclining in order to select the inclination of the regulating member 100. The inclining bridge 107 is arranged beneath the conventional regulating member carriage 102.

The inclining bridge 107 is similar or identical to that of the karussel in the first embodiment.

The inclining bridge 107 is mounted such that it can rotate about an axis of rotation $D_3$ passing through the conventional regulating member 102, the axis of rotation $D_3$ being parallel to the inclining bridge 107. The inclining bridge 107 comprises a longitudinal main platform 97 with a central hole and posts at the ends of the platform 97. Each post comprises an external pivot 187, 188 arranged along the axis of rotation $D_3$ on either side of the conventional regulating member carriage 102, and cooperating with two bearings of the plate.

The other features are identical to those of the bridge of the karussel 1, with the inclining bridge 107 further including a secondary platform 99. The actuating means include a wheel 185 mounted such that it is integral with the inclining bridge 107, the actuation of the wheel 185 causing the inclining bridge 107 to incline.

The actuating means include a wheel 185 mounted such that it is integral with the inclining bridge 107, the actuation of the wheel 185 causing the inclining bridge 107 to incline. The wheel 185 comprises an inclining toothing 145 disposed around one of the pivots 187, 188, the inclining toothing 145 extending parallel to the axis of rotation $D_3$. The inclining toothing 145 cooperates with actuating means. The actuating means mesh with the wheel 185, such that the inclining bridge 107 rotates about the axis of rotation $D_3$.

The inclination actuating means are identical to those described for the embodiments of the karussel 1 and of the tourbillon 10.

It goes without saying that the invention is not limited to the embodiments of regulating members described with reference to the figures and alternatives can be considered without leaving the scope of the invention. In particular, an at least partly movable member could be, for example, an automaton or a movable decorative part, such as a diamond or a rotation of the Earth, or a day/night display, which can be inclined according to preference. The at least partly movable member could also be a moon phase, a date, a power reserve indicator or a minutes counter of a chronometer, or even an aperture of a hidden display, or a GMT-type display. The member can also be a small seconds display, for example made of a precious stone, which can be viewed from different angles thanks to the means for adjusting the inclination of the member. Moreover, purely decorative elements can also be arranged on the inclining bridge, such as a representation obtained by etching or by thin-film deposition, or even a precious stone.

The invention claimed is:

1. A horological movement comprising:

a plate extending substantially in a first plane, the plate being configured to support other parts of the movement, including a member extending at least in part along a second plane; and variable adjustment means for variably adjusting an inclination of the member relative to the plate by a user, the variable adjustment means comprising an inclining bridge on which the member is mounted, the inclining bridge being inclining relative to the plate, such that the second plane forms an angle of variable value with the first plane of the plate.

2. The movement according to claim 1, wherein the inclining bridge comprises a longitudinal main platform on which the member is mounted.

3. The movement according to claim 1, wherein the inclining bridge comprises a secondary platform arranged beneath the main platform so as to arrange at least one staff between the two platforms.

4. The movement according to claim 1, wherein the inclining bridge is mounted such that it rotates about an axis of rotation passing through the member.

5. The movement according to claim 4, wherein the inclining bridge includes two external pivots arranged symmetrically on either side of the member, the pivots being arranged along the axis of rotation of the inclining bridge.

6. The movement according to claim 5, wherein each of the two external pivots cooperate with a bearing of the plate, the two external pivots being capable of rotating inside each bearing.

7. The movement according to claim 6, wherein the adjustment means include a wheel mounted such that it is integral with the inclining bridge, an actuation of the wheel generating the inclination of the inclining bridge.

8. The movement according to claim 1, wherein the wheel comprises an inclining toothing disposed around one of the two external pivots, the inclining toothing extending parallel to the axis of rotation of the inclining bridge.

9. The movement according to claim 1, further comprising means for actuating an inclination of the inclining bridge.

10. The movement according to claim 9, wherein the inclining toothing cooperates with the actuating means, the actuating means meshing with the wheel, such that the inclining bridge rotates about the axis of rotation of the inclining bridge.

11. The movement according to claim 10, wherein the actuating means include a gear train provided with a last wheel meshing with the inclining toothing of the wheel.

12. The movement according to claim 11, wherein the actuating means include a rod actuating the gear train by rotation of the rod, the rod being capable of being actuated from outside the plate.

13. The movement according to claim 1, wherein an angle of inclination of the member relative to the plate is in the range of 0° to 90°.

14. The movement according to claim 1, wherein the member is a regulating member provided with an inertial mass, a guide and an elastic return element for the inertial mass configured to cause it to oscillate, as well as an escapement mechanism cooperating with the inertial mass.

15. The movement according to claim 14, wherein the variable adjustment means for variably adjusting the inclination of the regulating member comprise a carriage inside which the inertial mass, the guide, the elastic return element and the escapement mechanism are arranged, the carriage being mounted on the inclining bridge.

16. The movement according to claim 15, wherein the carriage is capable of rotating relative to the inclining bridge, with the regulating member being a karussel, a tourbillon, or a conventional regulating member.

17. The movement according to claim 15, wherein the carriage (102) is unmoving relative to the inclining bridge.

18. The movement according to claim 1, wherein the member is an automaton or a decorative part of the movement.

19. A timepiece including the movement according to claim 1.

20. The movement according to claim 13, wherein the angle of inclination of the member relative to the plate is in the range of 0° to 45°.

* * * * *